(12) United States Patent
Kusaba et al.

(10) Patent No.: US 12,205,070 B2
(45) Date of Patent: Jan. 21, 2025

(54) PRODUCT RETURN/REPLACEMENT SYSTEM, PRODUCT RETURN/REPLACEMENT SERVER, AND PRODUCT RETURN/REPLACEMENT DEVICE

(71) Applicant: MITSUBISHI CORPORATION, Tokyo (JP)

(72) Inventors: Takuya Kusaba, Tokyo (JP); Yoshihiko Ryuu, Tokyo (JP)

(73) Assignee: MITSUBISHI CORPORATION, Tokyo (JP)

( * ) Notice: Subject to any disclaimer, the term of this patent is extended or adjusted under 35 U.S.C. 154(b) by 867 days.

(21) Appl. No.: 17/054,060

(22) PCT Filed: Apr. 24, 2019

(86) PCT No.: PCT/JP2019/017527
§ 371 (c)(1),
(2) Date: Nov. 9, 2020

(87) PCT Pub. No.: WO2019/216226
PCT Pub. Date: Nov. 14, 2019

(65) Prior Publication Data
US 2021/0304132 A1    Sep. 30, 2021

(30) Foreign Application Priority Data

May 7, 2018    (JP) .................................. 2018-089543

(51) Int. Cl.
*G06Q 10/0837*    (2023.01)
*G06K 1/12*    (2006.01)
(Continued)

(52) U.S. Cl.
CPC ......... *G06Q 10/0837* (2013.01); *G06K 1/121* (2013.01); *G06K 7/1413* (2013.01);
(Continued)

(58) Field of Classification Search
CPC ........... G06Q 10/0837; G06Q 10/0838; G06Q 20/18; G06Q 20/208; G06K 1/121;
(Continued)

(56) References Cited

U.S. PATENT DOCUMENTS 9,292,824 B1 *   3/2016   Freeman .......... G06K 19/06037
9,697,548 B1 *   7/2017   Jaff .................... G06Q 30/0601
(Continued)

FOREIGN PATENT DOCUMENTS

CN        103927641 A        7/2014
CN        104778509 A        7/2015
(Continued)

OTHER PUBLICATIONS

Anne D'Innocenzio, "New ways to return online purchases that just aren't right", Apr. 5, 2017; apnews.com, 6 pages (Year: 2017).*
(Continued)

*Primary Examiner* — Shannon S Campbell
*Assistant Examiner* — Freda A Nelson
(74) *Attorney, Agent, or Firm* — Oliff PLC

(57) ABSTRACT

A product return/replacement device performs return/replacement of products, the device having a computer and a printer. The computer is equipped with: a read unit that reads a return/replacement reception code that indicates that the consumer has made a return/replacement reservation; a communication unit that transmits the return/replacement code read by the read unit to an external return/replacement server, and receives from the return/replacement server a delivery code for managing the delivery status of the product; and a processor for causing the printer to print a label displaying the delivery code transmitted from the return/replacement serve. The consumer can affix the printed label to the product for return/replacement, and when the read unit has read the delivery code displayed on the label affixed to (Continued)

the product, the communication unit transmits the delivery code read by the read unit to the external return/replacement server.

7 Claims, 15 Drawing Sheets

(51) Int. Cl.
| | | |
|---|---|---|
| *G06K 7/14* | (2006.01) | |
| *G06K 19/06* | (2006.01) | |
| *G06Q 10/083* | (2023.01) | |
| *G06Q 20/18* | (2012.01) | |
| *G06Q 20/20* | (2012.01) | |

(52) U.S. Cl.
CPC ..... *G06K 7/1417* (2013.01); *G06K 19/06028* (2013.01); *G06K 19/06037* (2013.01); *G06Q 10/0838* (2013.01); *G06Q 20/18* (2013.01); *G06Q 20/208* (2013.01)

(58) Field of Classification Search
CPC ............... G06K 7/1413; G06K 7/1417; G06K 19/06028; G06K 19/06037
USPC ........................................................ 705/340
See application file for complete search history.

(56) References Cited

U.S. PATENT DOCUMENTS

| | | | | |
|---|---|---|---|---|
| 2004/0215531 A1* | 10/2004 | Stashluk, Jr. | ........ | G06Q 10/087 705/28 |
| 2005/0060165 A1 | 3/2005 | Knight et al. | | |
| 2015/0170111 A1* | 6/2015 | Evenson | ................ | G06Q 50/26 705/308 |
| 2015/0371199 A1* | 12/2015 | Ezell | .................. | G06Q 10/0832 705/308 |
| 2018/0046978 A1* | 2/2018 | Tartal | ..................... | G06Q 50/60 |
| 2018/0144301 A1* | 5/2018 | Engel | ................. | G06Q 10/0837 |
| 2019/0108525 A1* | 4/2019 | Nelms | .................. | G06Q 20/047 |
| 2019/0244214 A1* | 8/2019 | Flores | ................ | G06Q 30/0281 |

FOREIGN PATENT DOCUMENTS

| | | | |
|---|---|---|---|
| EP | 1 274 033 A1 | 1/2003 | |
| JP | 2002-193449 A | 7/2002 | |
| JP | 2004-26478 A | 1/2004 | |
| JP | 2009-104355 A | 5/2009 | |
| JP | 2014-10617 A | 1/2014 | |
| JP | 2017-102568 A | 6/2017 | |
| JP | 2018-18407 A | 2/2018 | |
| WO | WO-2012178047 A1 * | 12/2012 | ......... G06Q 10/0837 |

OTHER PUBLICATIONS

Apr. 21, 2023 Office Action issued in European Patent Application No. 19800026.7.

Dec. 14, 2021 Extended European Search Report issued in European Patent Application No. 19800026.7.

Nov. 10, 2020 International Preliminary Report on Patentability issued International Patent Application No. PCT/JP2019/017527.

Lawson Co., Ltd., "Lawson News. Rental & EC product return / return service "Sumari SMARI" started"; Mar. 26, 2019; http://news.shoninsha.co.jp/strategy/124646.

* cited by examiner

Fig.4

| PRODUCT RETURN/REPLACEMENT RECEPTION CODE | STATUS | RECEPTION STORE | LOGISTICS CENTER | DELIVERY CODE | RECEPTION DATE AND TIME |
|---|---|---|---|---|---|
| SR012345012345 67 89 | RECEPTION | TOKYO STORE | KANTO CENTER | 55550001 | 2018/03/01 |
| SR012345012345 67 891 | STORE COLLECTION | OSAKA STORE | KANSAI CENTER | 55550002 | 2018/03/01 |
| SR012345012345 68 01 | LOGISTICS CENTER ARRIVAL | KOBE STORE | KANSAI CENTER | 55550003 | 2018/03/01 |
| SR012345012345 68 95 | STORE COLLECTION | YOKOHAMA STORE | KANTO CENTER | 55550004 | 2018/03/02 |
| SR012345012345 69 65 | RECEPTION | YOKOHAMA STORE | KANTO CENTER | 55550005 | 2018/03/02 |
| SR012345012345 69 77 | LOGISTICS CENTER ARRIVAL | YOKOHAMA STORE | KANTO CENTER | 55550006 | 2018/03/03 |
| | | | | | |
| | | | | | |
| | | | | | |
| | | | | | |

Fig.13

STEP 1

```
DELIVERY       DELIVERY NUMBER : 123456781234
COMPLETION     ORDER DATE      : 2015/03/13

TOTAL AMOUNT   3784 YEN (INCLUDING TAX)
ORDER NUMBER   SL0000014145

[ SEE DETAILS OF ORDER HISTORY ]
        [ INQUIRY ABOUT PRODUCT RETURN ]
```

```
LONG ONE-PIECE [M]

UNIT PRICE 2704 YEN (EXCLUDING TAX)
        ORDER QUANTITY: ONE

REASON FOR PRODUCT RETURN
        [ DEFECTIVE PRODUCT ]

PRODUCT RETURN QUANTITY
        [ ONE ]

DEFECTIVE PRODUCT : WRITE DETAILS  *ESSENTIAL
        [                          ]
                        WITHIN 200 CHARACTERS

[ ] EXCHANGE OF PRODUCTS IS DESIRED
```

Fig. 14
STEP 2
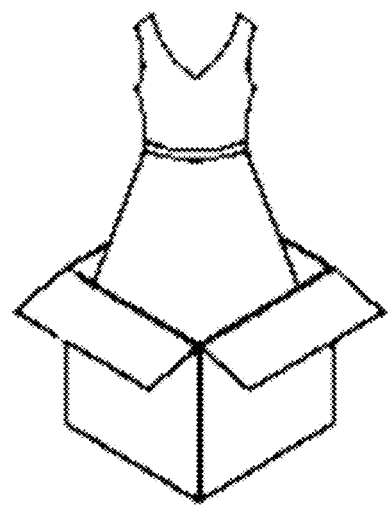
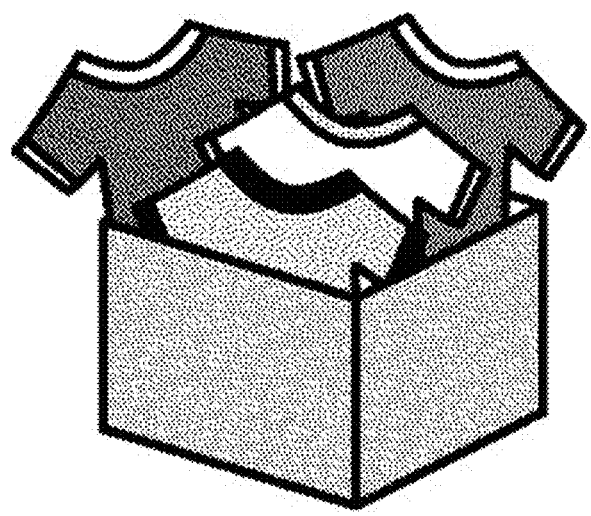

Fig. 15

STEP 3

DELIVERY COMPLETION
DELIVERY NUMBER : 0001234
ORDER DATE : 2016/06/01
TOTAL AMOUT    4852 YEN (INCLUDING TAX)
ORDER NUMBER   SL00345569

SEE DETAILS OF ORDER HISTORY

PRODUCT RETURN INQUIRY DATE: 2017/06/01

PRODUCT RETURN: INPUT SLIP NUMBER

PRODUCT RETURN: INPUT PRODUCT COLLECTION INFORMATION

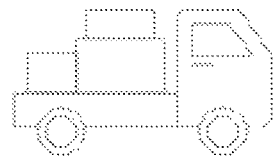

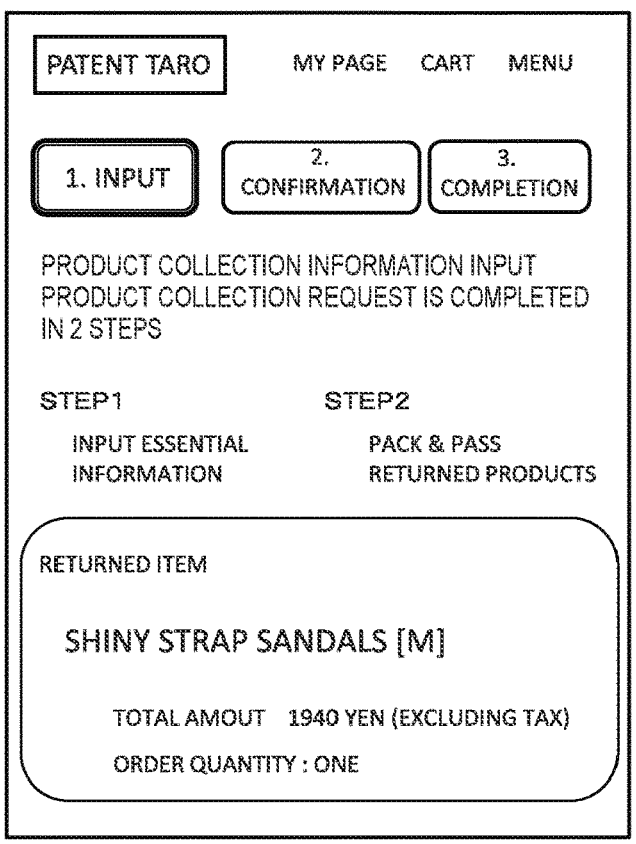

PATENT TARO    MY PAGE   CART   MENU

1. INPUT    2. CONFIRMATION    3. COMPLETION

PRODUCT COLLECTION INFORMATION INPUT
PRODUCT COLLECTION REQUEST IS COMPLETED IN 2 STEPS

STEP1                STEP2
INPUT ESSENTIAL      PACK & PASS
INFORMATION          RETURNED PRODUCTS

RETURNED ITEM

SHINY STRAP SANDALS [M]

TOTAL AMOUT    1940 YEN (EXCLUDING TAX)
ORDER QUANTITY : ONE

PRODUCT RETURN/REPLACEMENT SYSTEM, PRODUCT RETURN/REPLACEMENT SERVER, AND PRODUCT RETURN/REPLACEMENT DEVICE

TECHNICAL FIELD

The present invention relates to a product return/replacement system for electronic commerce. The present invention also relates to a product return/replacement server which is used in a product return/replacement system for electronic commerce. The present invention also relates to a product return/replacement device which can be used, for example, for the return/replacement of a product in the electronic commerce described above.

BACKGROUND ART

Today, electronic commerce utilizing the Internet and the like is widely used.

The electronic commerce (EC: which is also referred to as electric commerce) as described above is convenient for consumers as they can purchase a product without visiting an actual store. Sales business operator (hereinafter simply referred to as the business operator) can sell their products efficiently because they do not need to prepare a large store and the like. The electronic commerce is widely used due to various advantages as described above.

As described above, the electronic commerce is convenient. However, it can be assumed that consumers may receive the product that is different from the one they expected because they purchase the product without seeing the actual one. In that case, in general, the consumer can return (send back) the product.

Furthermore, in recent years, a mechanism has been used which allows consumers to receive a plurality of products, select and purchase a desired product, and return the remaining products. The mechanism has also been used which allows business operators to lend a product to the consumer and consumers to replace the product through a home-delivery operator or the like. Consequently, the rate of return/replacement of products has been much more increased than before.

An illustrative view showing the flow of conventional product return/replacement is shown in FIG. 12. In FIG. 12, two types of flow of product return/replacement (a product return/replacement flow A and a product return/replacement flow B) are shown.

First, the product return/replacement flow A is a flow where a consumer 10 uses a home-delivery operator 14 so as to deliver a product that is a product return/replacement target from home to an EC operator 16 from which the product is purchased. On the other hand, the product return/replacement flow B is a flow where the consumer 10 brings the product that is the product return/replacement target into a store 12 or the like of the home-delivery operator 14 and where the store 12 or the like delivers the product through the home-delivery operator 14 to the EC operator 16 from which the product is purchased.

For example, the product return/replacement processing thereof is performed as follows.

Step 1

The consumer 10 makes a product return/replacement reservation at an EC site which is operated by the EC operator 16 (see FIG. 13). As shown in FIG. 13, the consumer 10 touches (or clicks) a button on product return/replacement at the EC site so as to apply for the product return/replacement. In the example of FIG. 13, after the consumer 10 applies for the product return/replacement, the screen thereof is shifted to a screen on which a reason for the product return/replacement and the number of products to be returned/replaced are input. When the inputting of data on the product return/replacement is completed, the product return/replacement reservation is completed. Thereafter, a mail message in which product collection information is described is send from the EC site to the consumer 10. The consumer 10 uses the product collection information in step 3 which will be described later.

In the case of the product return/replacement flow A, when the EC operator 16 receives the product return/replacement reservation described above, the EC operator 16 transmits, to the consumer 10, the mail message in which the product collection information mentioned above is described, and requests the home-delivery operator 14 to perform the product return/replacement processing. This request is the processing that includes the performance of processing a product collection from the home of the consumer 10 (see FIG. 12).

In the case of the product return/replacement flow B, when the EC operator 16 receives the product return/replacement reservation described above, the EC operator 16 transmits, to the consumer 10, the mail message in which the product collection information mentioned above is described (see FIG. 12).

<Case where Invoice is Included at Time of Delivery>

Depending on the EC operator, there is a case where when a product is delivered, an invoice (or a delivery slip or the like) for product return/replacement is included in the product. In such a case, as described above, the consumer 10 makes a product return/replacement reservation at the site of the EC operator, and writes information necessary for the product return/replacement in the invoice (delivery slit). Examples of the necessary information preferably include the number of products to be returned/replaced, a reason for the product return/replacement, a reason classification, and the like.

Step 2

After the product return/replacement reservation is made, the consumer 10 packs the product with a predetermined packing material (see FIG. 14). When a box which is used at the time of delivery can be used without being processed, the box may be used or another packing material may be used.

<Case where Invoice is Included at Time of Delivery>

If the EC operator send an invoice (or a delivery slip or the like) together with the product by the time of its delivery, the consumer 10 sticks the invoice to the packing.

Step 3

Then, the consumer 10 receives the mail message in which the product collection information mentioned above is described, inputs the product collection information on the screen of the delivered product (the screen of the EC site), performs, for example, the inputting of a date and time on the product collection and waits for the home-delivery operator 14 to come to collect the product (product return/replacement flow A). The consumer 10 waits for the home-delivery operator 14 to come to collect the product at home, and then passes the packed product to the home-delivery operator 14. In the case of the product return/replacement flow B, the consumer 10 brings the product into the store 12 or the like by himself or herself. The home-delivery operator 14 receives the product at the store 12.

Then, in the case of the product return/replacement flow A, the home-delivery operator 14 delivers the product collected from the home of the consumer 10 to the EC operator 16. In the case of the product return/replacement flow B, the home-delivery operator 14 delivers the product received at the store 12 to the EC operator 16.

In this way, the return/replacement of the product is completed, and thereafter there may be a case where a refund is issued from the EC operator 16 to the consumer 10 by a predetermined method. The refund is performed by various methods such as bank transfer and giving points.

It is assumed that the home-delivery operator 14 includes not only a business operator which provides a so-called home-delivery service but also a postal operator. The store 12 or the like includes not only a store of a general retailer which serves as a so-called agency of the service of the home-delivery operator 14 but also a branch of the home-delivery operator 14, that is, a home-delivery office.

PATENT LITERATURES

For example, patent literature 1 described below discloses a product delivery system in which the protection of personal information is enhanced. This product delivery system includes a personal-information management server in which personal information of users is stored and a delivery person terminal which is used by a delivery person. The delivery person terminal uses the information code of the delivery slip of a package to access the personal-information management server, and acquires and displays delivery destination information. It is disclosed that the delivery person performs delivery with only the delivery destination information and that thus the personal information is protected.

Patent literature 2 described below discloses a product purchase system in which personal information is concealed in the purchase of a product through the Internet. Specifically, it is disclosed that product purchase information and product information are separated and that the product can be purchased without the personal information of a purchaser being disclosed to the seller of the product.

Patent literature 3 described below discloses a cancellation system which can perform, when a product is delivered by cash on delivery, cancellation processing for the return of the product. Patent literature 3 particularly discloses cancellation processing using a cancellation tablet terminal in an experience-based shop which handles only trial products.

CITATION LIST

Patent Literature

Patent Literature 1: Japanese Unexamined Patent Application Publication No. 2017-102568
Patent Literature 2: Japanese Unexamined Patent Application Publication No. 2009-104355
Patent Literature 3: Japanese Unexamined Patent Application Publication No. 2018-18407

SUMMARY OF INVENTION

Technical Problem

In the product return/replacement flow A shown in FIG. 12, problems as described below are present.

In a product collection time frame in the above description (step 3), the consumer 10 needs to wait at home.

A home-delivery person knows the home of the consumer 10. In particular, the rate of female consumers 10 who dislike their homes being known is high.

In the product return/replacement flow B shown in FIG. 12, a problem as described below is present.

The work of a salesclerk at the store 12 or the like tends to be complicated. The amount of operation of a cash register is increased, and thus a long line of consumers tends to be made.

Problems as described below are present which are common to the product return/replacement flows A and B.

Since personal information such as the address of the consumer 10 is described in the invoice of the home-delivery operator 16, the personal information may leak out.

The cost for sending back the product is high. Unlike the dispatch of the product, the number of packages of returned products is low, and thus efficient operation of trucks cannot often be performed. Consequently, the overall cost for the product return tends to be excessive.

The "product return" in the present specification refers to the whole of a series of processing steps from the application for the product return, to the procedure of the product return, to the sending back of the product and to the return of the payment. The "product replacement" refers to the whole of a series of processing steps from the lending of the product to the consumer by the business operator to the replacement of the product by the consumer through the home-delivery operator or the like. The "sending back" in the present specification refers to the delivery of the product to the EC operator in the product return/replacement, that is, the delivery for returning the product to the EC operator.

The invention of the present application is made to solve the problems described above, and an object thereof is to provide a product return/replacement system for electronic commerce which can return/replace a product and which can return/replace the product with a simple method by a consumer. A further object is to provide a product return/replacement system in which the possibility that personal information leaks out is lower. Another object of the present invention is to provide a product return/replacement system for electronic commerce which can return/replace a product and which can more decrease a cost for product return/replacement. An object of the present invention is also to provide a product return/replacement server and a product return/replacement device which form these product return/replacement systems. In the present patent, unless otherwise specified, the "product return/replacement" means "one or both of product return and product replacement". In other words, the present invention is used in one of the "product return" of a product and the "product replacement" of a product, and further includes a case where the present invention is used both in the "product return" and in the "product replacement".

Solution to Problem (1) According to the present invention, in order to solve the problems described above, a product return/replacement device for returning/replacing a product is provided that includes a computer and a printer, the computer includes a reading portion which reads a product return/replacement reception code that is presented by a consumer who wants to return/replace the product and that indicates that a product return/replacement reservation is made, a communication portion which transmits the product return/replacement reception code read by the reading portion to an external product return/replacement server so as to receive a delivery code for managing a delivery status of the product from the product return/replacement server and a processor which makes the printer print a label on which the delivery code transmitted from the product return/replacement server is displayed, the consumer can stick the printed label to the product related to the return/replacement and when the reading portion reads the delivery code which is displayed on the label stuck to the product, the communication portion transmits the delivery code read by the reading portion to the external product return/replacement server.

(2) According to the present invention, the product return/replacement device described in (1) includes a product storage portion in which the product is stored, and the consumer can store, in the product storage portion, the product related to the return/replacement to which the label is stuck.

(3) According to the present invention, in the product return/replacement device described in (1) or (2), the product return/replacement reception code is a product return/replacement reception code that is acquired by the consumer from an electronic commerce server of an electronic commerce operator from which the product is purchased/lent.

(4) According to the present invention, in the product return/replacement device described in any one of (1) to (3), the product return/replacement reception code is displayed on a product return/replacement reservation label that is included in the product sent by the electronic commerce operator from which the product is purchased/lent, and the reading portion reads the product return/replacement reception code on the product return/replacement reservation label.

(5) According to the present invention, in the product return/replacement device described in any one of (1) to (4), the product return/replacement reception code is a two-dimensional code or a one-dimensional code.

(6) According to the present invention, in order to solve the problems described above, the product return/replacement server for communicating with the product return/replacement device described in any one of (1) to (5) through a predetermined communication channel so as to manage the return/replacement of the product is provided that includes: a product return/replacement database in which data of processing of the return/replacement of the product is registered; a communication portion which performs communication with the outside so as to receive the product return/replacement reception code; a control portion which registers, when the communication portion receives the product return/replacement reception code, a record related to the product return/replacement reception code in the product return/replacement database; and a delivery code generation portion which generates, when the communication portion receives the product return/replacement reception code, the delivery code corresponding to the product return/replacement reception code, the control portion transmits the delivery code generated by the delivery code generation portion to the communication portion and the communication portion returns the delivery code to a party which transmits the product return/replacement reception code.

(7) According to the present invention, in the product return/replacement server described in (6), each time the product return/replacement reception code is received, the delivery code generation portion sequentially generates the delivery code which is a serial number.

(8) According to the present invention, in the product return/replacement server described in (6) or (7), when the communication portion receives the delivery code, the control portion updates, according to the transmission source of the delivery code, the status of data corresponding to the delivery code in the product return/replacement database.

(9) According to the present invention, in the product return/replacement server described in any one of (6) to (8), when the communication portion receives the delivery code and the transmission source of the delivery code is a terminal of the electronic commerce operator which is the destination of the return/replacement, the control portion updates the status of the data corresponding to the delivery code in the product return/replacement database to return/replacement completion, and transmits the product return/replacement reception code of the electronic commerce operator.

(10) According to the present invention, a product return/replacement system is provided that includes: the product return/replacement device described in any one of (1) to (5) which is located in a store that is a predetermined delivery destination; and the product return/replacement server described in any one of (6) to (9) which can communicate with the product return/replacement device through the predetermined communication channel.

(11) According to the present invention, a product return/replacement system is provided that includes: the product return/replacement device described in any one of (1) to (5) which is located in a predetermined logistics site; and the product return/replacement server described in any one of (6) to (9) which can communicate with the product return/replacement device through the predetermined communication channel.

Advantageous Effects of Invention

According to the present invention, the possibility that personal information leaks out in the return or replacement of a product is reduced. A consumer can return or replace the product with a simple method. Moreover, according to the present invention, it is possible to reduce a cost for the return or replacement of the product.

BRIEF DESCRIPTION OF DRAWINGS

FIG. 4 is an illustrative view showing the details of registration of a product return/replacement database 304 in the present embodiment;

FIG. 13 is an illustrative view of an operation of the return of the product in the conventional electronic commerce;

FIG. 14 is an illustrative view of the operation of the return of the product in the conventional electronic commerce; and FIG. 15 is an illustrative view of the operation of the return of the product in the conventional electronic commerce.

DESCRIPTION OF EMBODIMENTS

A product delivery system 100 in preferred embodiments of the present invention will be described below with reference to drawings.

1. Introduction (Basic Concept, Principles of Present Embodiment)

In order to solve the problems in the product return/replacement of the conventional electronic commerce described above, the inventors of the present application have continuously performed thorough studies, and thereby have formed the idea of constructing a product delivery system which uses main logistics for general retailers so as to be able to provide a product return/replacement service. Furthermore, they have formed the idea of installing a box for the return/replacement of products in the store of the retailer in order to reduce the possibility that personal information of a consumer leaks out and to reduce, for example, an inconvenience in which the consumer needs to wait for product collection at home. By organically connecting these various ideas together, a product delivery system as described below has been constructed. The details thereof will be described below.

A. Embodiment 1

2. Basic Flow of Processing of Product Delivery System for Electronic Commerce (Product Return/Replacement)

Figure 1:
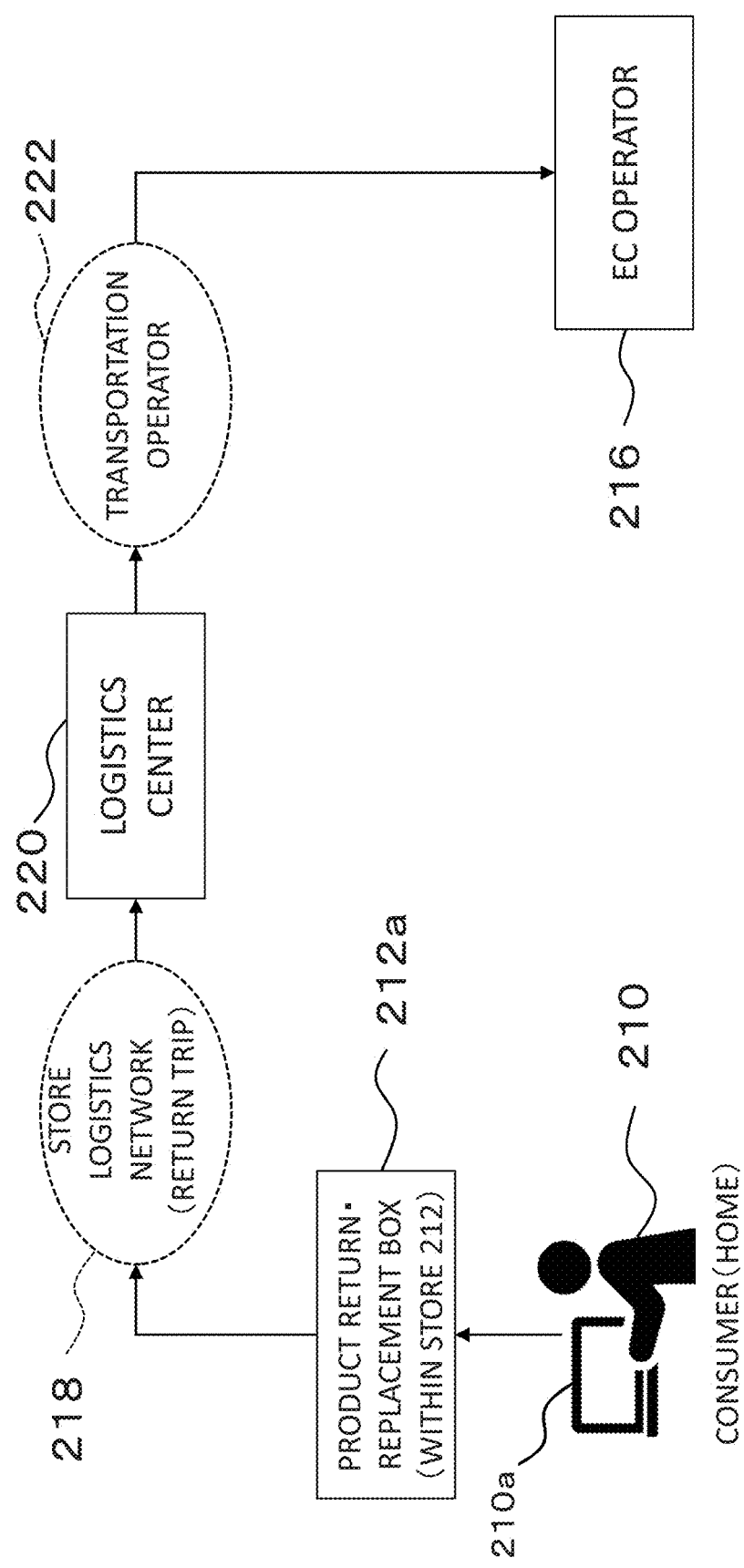
FIG. 1 is an illustrative view showing the flow of product return/replacement processing in a product delivery system for electronic commerce 100 according to the present embodiment.

FIG. 1 is an illustrative view showing the flow of processing of a product delivery system for electronic commerce according to the present embodiment 1.

The product delivery system for electronic commerce according to the present embodiment 1 is a system which is characterized in the processing operation of the return or replacement of a product, and a description will be mainly given below of the processing of the return or replacement thereof.

Although in the following description, an example of the product return will be mainly described in particular, unless otherwise specified, the processing operation of the product replacement can likewise be performed. In other words, parts which are described only as the "product return" in the following description are replaced by the "product replacement", thus the processing operation thereof can likewise be performed and such a case is also included in the technical scope of the present patent.

Figure 12:
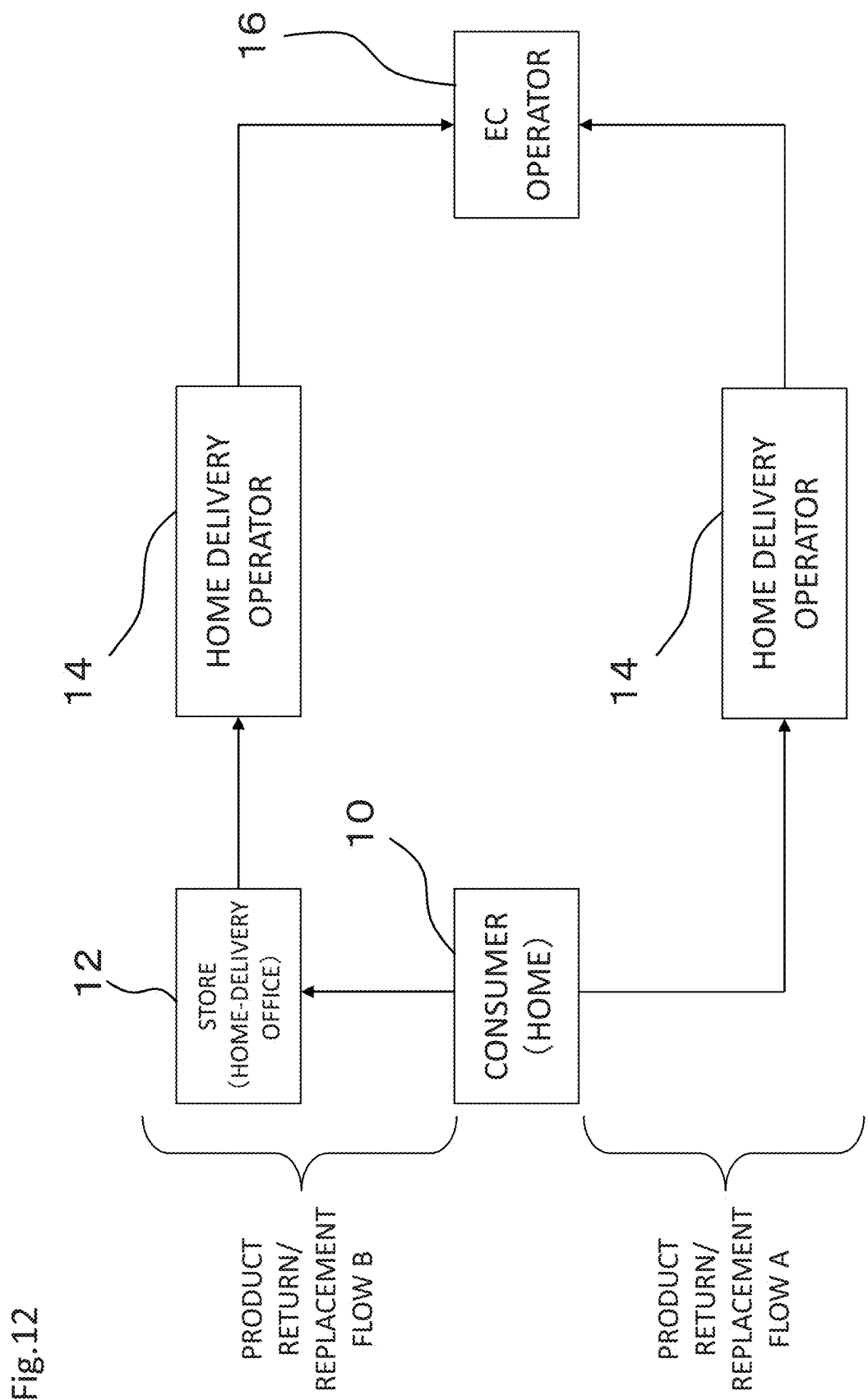
FIG. 12 is an illustrative view showing a route of the return/replacement of a product in conventional electronic commerce.

A consumer 210 first accesses an EC site from which a product is purchased so as to make a product return/replacement reservation. This operation is the same as the operation described in FIG. 12.

The consumer 210 then brings the product which is a target to be returned/replaced into a store of a predetermined retailer so as to post the product into a product return/replacement box 212a within the store. The product return/replacement box 212a may be a so-called KIOSK terminal.

The product return/replacement box 212a corresponds to a preferred example of a product return/replacement device in the scope of claims.

In the store 212, a store logistics network 218 for delivering products to be sold is provided. For example, a truck of the store logistics network 218 is driven between a logistics center 220 and the store 212 in order to carry the products to be sold to the store. Hence, in general, the truck is driven from the logistics center 220 to the store while loading the products to be sold at the store, unloads the products at the store 212 and returns to the logistics center 220 in a state where the truck is "empty" without any load.

The present embodiment 1 is characterized in that in the return trip of the store logistics network 218, products (products related to the return/replacement) which are posted into the product return/replacement box 212a are collected and delivered. The store logistics network 218 (return trip) in which the "empty" truck has so far been only driven is used so as to send back the products that are targets to be returned/replaced, and thus the store logistics network 218 can be effectively used.

The truck on which the products related to the return/replacement are loaded arrives at the logistics center 220 through the store logistics network 218. In the logistics center 220, the products related to the return/replacement are sorted according to EC operators 216, and are thereafter sent back to the individual EC operators 216.

The sending back described above is performed by a predetermined transportation operator 222.

As the actual sending-back route, various routes may be taken according to the store logistics network 218 and the form of the transportation network of the transportation operator.

By the flow of the processing as described above, unique effects as described below are achieved in the present embodiment.

The consumer 210 can return/replace the product with timing which is convenient for himself or herself. In other words, the consumer 210 can return/replace the product at a time which is convenient for himself or herself in the store 212 which is convenient, and thus it is possible to return/replace the product at the time which is convenient for the consumer 210.

Although for the product return or replacement, the consumer 210 conventionally needs to fill in an invoice (such as a delivery slip) for a home-delivery operator, as will be described later, in the present embodiment, it is not necessary to do so, with the result that it is possible to easily return or replace the product.

Since the product return/replacement box 212a is arranged in the store 212, and the consumer 210 posts the product related to the return/replacement into it by himself or herself, almost no burden is placed on the workers of the store 212. In the present embodiment, as will be described later, the consumer 210 basically posts the product into the product return/replacement box 212*a* by himself or herself, and thus the store workers encounter almost no trouble.

Since personal information does not directly appear, there is a low possibility that personal information leaks out. In the present embodiment, as will be described later, a two-dimensional code such as a QR code is used, and thus information of the consumer 210 and information on the return/replacement are expressed. Furthermore, the two-dimensional code represents a delivery code indicating product return processing, and the delivery code does not include personal information. Hence, on the product which is being delivered for the return/replacement, the personal information of the consumer does not directly appear. Consequently, personal information can be protected more reliably.

As shown in FIG. 1, the return trip of the existing store logistics network 218 is effectively used. Hence, it is possible to reduce the cost for sending back the product and to contribute to high efficiency of the logistics.

3-1 Configuration of Product Return/Replacement System

Figure 2:
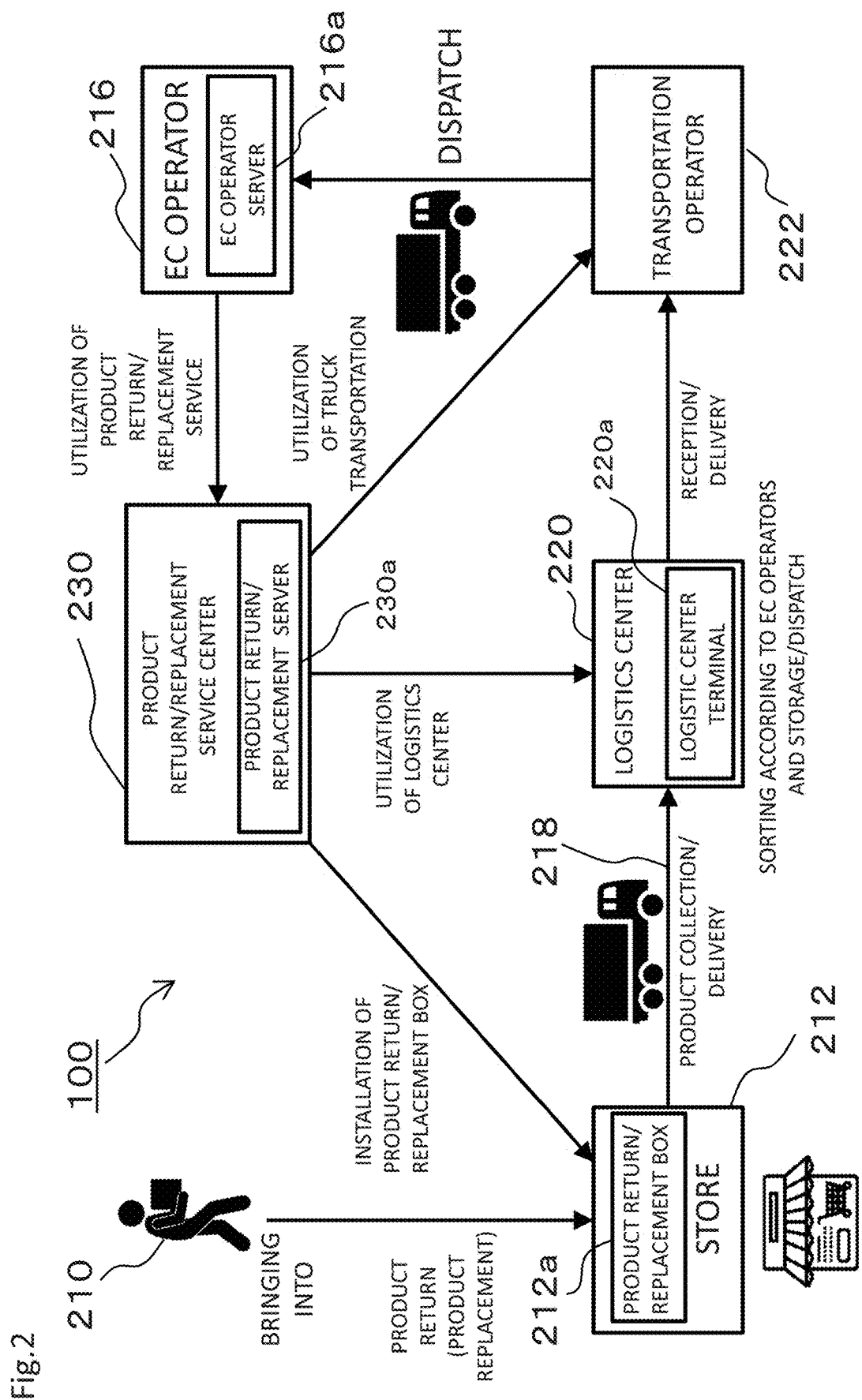
FIG. 2 is an illustrative view showing the configuration of the product delivery system for electronic commerce 100 according to the present embodiment.

An overall configuration view of the product return/replacement system 100 for realizing the processing as shown in FIG. 1 is shown in FIG. 2. The product return/replacement system corresponds to a preferred example of a product return/replacement system in the scope of claims.

Consumer

As shown in FIG. 2, the consumer 210 makes a product return/replacement reservation, thereafter packs the product related to the return/replacement, brings the product into the store 212 and posts the product into the product return/replacement box 212*a* of the store 212. The product return/replacement reservation may be made at a place other than home. The product return/replacement box 212*a* is provided in the store 212, and the consumer 210 operates the product return/replacement box 212*a* so as to post the product related to the return/replacement thereinto. The packing may be performed in the store 212 by utilization of a box (such as a cardboard box) provided in the store 212.

Store

Based on the store logistics network 218, the truck periodically carries products to the store 212. The driver of the truck removes the posted products (products related to the return/replacement) from the product return/replacement box 212*a*, loads them on the truck and delivers them to the logistics center 220.

The present embodiment 1 is characterized in that the "return trip" of the store logistics network 218 is used so as to collect and deliver the products related to the return/replacement. Since the product collection described above is basically performed by the driver of the truck, the store workers do not involve the operation of the product return/replacement box 212*a* in principle.

The store 212 is a target of the store logistics network 218, and any type of store 212 may be adopted as long as a mechanism of periodical product delivery using a truck or the like is provided. A retail chain store, a franchise store or the like may be adopted. A so-called convenience store may also be adopted.

Since the workers of the store are basically not involved in the operation of the product return/replacement box 212*a*, as the store, for example, an unmanned store may be adopted.

For example, a facility in which only a vending machine is installed can be used as the "store" in the present embodiment. This is because a truck periodically carries products in order to bring the products into the vending machine and thus the store logistics network 218 is present.

Product Return/Replacement Service Center

As a unit which performs overall control on the product return/replacement system 100 in the present embodiment, a product return/replacement service center 230 is provided.

The product return/replacement service center 230 contracts with the EC operator 216 in terms of business so as to provide the product return/replacement service. In order to provide the product return/replacement service, the product return/replacement service center 230 installs, in the store 212, the product return/replacement box 212*a* which can be used by the consumer 210 so as to provide the product return/replacement service for the consumer 210.

The product return/replacement service center 230 requests the logistics center 220 to receive the products related to the return/replacement and to sort the products according to EC operators 216. Although in FIG. 2, only one EC operator 216 is shown, a plurality of EC operators 216 may be present. The product return/replacement service center 230 also requests the logistics center 220 to store the products related to the return/replacement as necessary and to pass the products related to the return/replacement to the transportation operator 222. The product return/replacement service center 230 requests the transportation operator 222 to receive the products related to the return/replacement from the logistics center 220 and to deliver them to the EC operator 216.

As described above, the product return/replacement service center 230 serves as a center for providing the product return/replacement service.

The product return/replacement service center 230 includes a product return/replacement server 230*a* so as to intensively manage the product return/replacement service. The operation thereof will be described in detail later.

Logistics Center

The logistics center 220 receives the products related to the return/replacement from the truck which is driven in the store logistics network 218, sorts them according to EC operators 216 and store them as necessary. As the logistics center 220, various existing logistics centers 220 may be used. A delivery center, a warehouse, and a facility similar thereto may be used.

Transportation Operator

The transportation operator 222 receives the request from the product return/replacement service center 230, receives the product related to the return/replacement from the logistics center 220 (indicated by "reception/delivery" in FIG. 2) and delivers the product with the truck or the like to the EC operator 216 which is the destination thereof. Here, the products have already been sorted according to EC operators 216, and thus each truck delivers the sorted product to the EC operator 216 which is the destination thereof.

EC Operator

The EC operator 216 operates the EC site, and requests the product return/replacement service center 230 to provide the convenient product return/replacement service which can be used when the consumer 210 returns/replaces the product that is purchased at the EC site or is lent from the EC site regardless of whether it is paid or free. Although only one EC operator 216 is shown in FIG. 2, a plurality of EC operators 216 may be present, and the logistics center 220 sorts the products related to the return/replacement according to EC operators 216.

The EC operator 216 includes an EC operator server 216a, and thus the EC operator 216 can manage the return/replacement service of the products. The operation thereof will be described in detail later.

3-2 Characteristic Device Configuration at Each Site

As described above, at the sites shown in FIG. 1, characteristic devices are provided. The devices will be described below.

(a) Product Return/Replacement Server 230a in Product Return/Replacement Service Center 230

Figure 3:
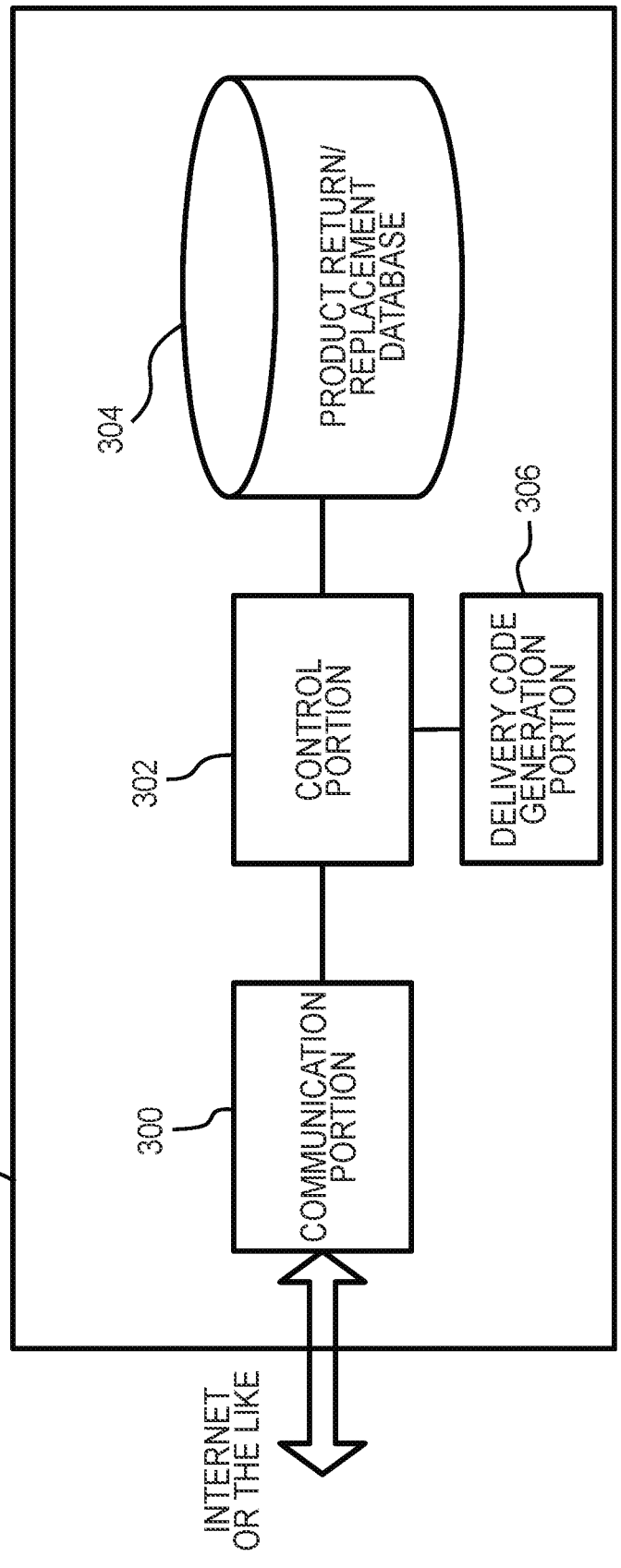
FIG. 3 is a configuration view showing the configuration of a product return/replacement server 230a according to the present embodiment.

As described in FIG. 2, in the product return/replacement service center 230, the product return/replacement server 230a is provided. The configuration of the product return/replacement server 230a is shown in FIG. 3. As shown in the figure, the product return/replacement server 230a includes a product return/replacement database 304, a control portion 302 which controls the registration/reading of data on the product return/replacement with respect to the product return/replacement database 304 and a communication portion 300 which communicates with the outside.

The communication portion 300 is a communication interface which communicates with the outside, and may be, for example, a communication interface which is connected to the Internet. Hence, a predetermined external terminal and the like can access the product return/replacement server 230a through the communication interface 300. The Internet corresponds to a preferred example of a predetermined communication channel in the scope of claims.

For example, the control portion 302 registers, by a request from the outside, various types of data on the product return/replacement in the product return/replacement database 304, and reads, according to a request from the outside, data on the product return/replacement from the product return/replacement database 304 so as to transmit the data to the outside. Specific operations will be described later. The control portion 302 may be formed with, for example, programs which describe the operations of the control portion 302 and a CPU which executes the programs. The operations which will be described later are described with the programs.

The CPU corresponds to a preferred example of a processor in the scope of claims. Instead of the CPU, any means may be adopted as long as it executes a predetermined operation based on a predetermined program, and a CPU module, various types of microcomputers and various types of computation processors/computation units may be adopted. They also correspond to preferred examples of the processor in the scope of claims.

When product return/replacement is performed, a delivery code generation portion 306 generates a delivery code for the product return/replacement. A specific operation will be described later. As with the control portion 302, the delivery code generation portion 306 may be formed with, for example, programs which describe the operation of the delivery code generation portion 306 and a CPU which executes the programs.

The delivery code is a code for managing the actual delivery status, and is a code for grasping the delivery status. When the delivery code is transmitted from a predetermined device to the product return/replacement server 230a, based on the transmission source thereof, the delivery status of the product return/replacement can be determined, and it can be reflected on the product return/replacement database 304 which will be subsequently described.

The product return/replacement database 304 is a database in which data on the product return/replacement is registered, and data is registered for each of products related to the return/replacement. Here, items stored in the product return/replacement database 304 include a product return/replacement reception code, a status, a reception store, a logistics center, a delivery code, a reception date and time and the like. This state is shown in FIG. 4.

The product return/replacement reception code is a code which is provided by the EC operator 216 when the product return/replacement service is started, and the product return/replacement reception code can indicate that a product return/replacement reservation is made. At the same time, the product return/replacement reception code indicates a unit which manages product return/replacement processing, and the product return/replacement reception code is used to be able to manage the processing of the product return/replacement. Hence, in the product return/replacement database 304, for each of the product return/replacement reception codes, the status, the reception store, and the like are registered (see FIG. 4), and thus it is possible to manage how each product return is performed.

As shown in FIG. 4, the product return/replacement reception code is formed with, for example, SR, and EC operator code of 6 digits and an EC operator arbitrary setting code (arbitrary number of digits). Here, the SR is a code which is used for identifying a service and is an acronym for Smart Return, and the SR itself does not have a specific meaning. Another code may be adopted.

The EC operator code is an ID for identifying the EC operator 216 and a 6-digits number for identifying the EC operator 216.

The EC operator arbitrary setting code is a code of an arbitrary number of digits which can be freely determined by the EC operator 216. For example, it is convenient that the EC operator arbitrary setting code includes a "product code" related to the return/replacement and the like. The EC operator arbitrary setting code may include the ID of a consumer, a manufacturing number, and another code. The EC operator arbitrary setting code may be freely determined by the EC operator 216.

As shown in FIG. 4, the product return/replacement reception code "SR0123450123456789" means that the EC operator code is "012345" and that the EC operator arbitrary setting code is "0123456789". In an example shown in FIG. 4, the product return/replacement reception code "SR0123450123456789" indicates the status where reception is made, the store where the reception is made, which is Tokyo store, and the date and time when the reception is made, which is Mar. 1, 2018. In the other examples shown in FIG. 4, the status, the reception store and the reception date and time are individually managed.

For example, with the product return/replacement reception code "SR0123450123456791", it is possible to grasp, from the item of the "status", that the product is collected at the store 212. The product return/replacement reception code "SR0123450123456801" indicates that the product is collected at the store 212 and is returned to the logistics center 220 (logistics center).

Although in FIG. 4, as the item name, the "product return/replacement reception code" is used, the "product return/replacement reception code" may be divided into two types of items which are the "operator code" and the "EC operator arbitrary setting code", and they may be registered and managed in the product return/replacement database 304.

Examples of the "status" in the product return/replacement database 304 shown in FIG. 4 include "reception" indicating a state where the product related to the return/replacement is received at the store 212, "store collection" indicating a state where the product is collected at the store 212, "logistics center return" indicating a state where the product related to the return/replacement is returned to the logistics center 220 and the like. The "store collection" may be referred to as "product collection". The "logistics center return" may be referred to as "product arrival". In addition, as the status, various statuses may be adopted. For example, "dispatch to EC operator" indicating a state where the product is dispatched from the logistics center 220, "EC operator arrival" indicating a state where the product arrives at the EC operator and the like may be adopted. The examples mentioned here are simply examples of the "status", a larger number of types of "status" or a smaller number of types thereof may be adopted.

The "reception store" in the product return/replacement database 304 shown in FIG. 4 indicates the store 212 which receives the product related to the return/replacement. As the name thereof, any name may be adopted. Shinjuku store and Shinagawa store may be adopted, and the first store in Tokyo and the like may be adopted. The "logistics center" in the product return/replacement database 304 is a center site for the sending back of the product related to the return/replacement, and is the logistics center 220 in FIG. 2. The logistics center 220 is somewhat determined to be in charge of stores 212, for example, a logistics center 220 whose name is "Kanto center" is in charge of "Tokyo store" and "Yokohama store" that are stores 212. A logistics center 220 whose name is "Kansai center" is in charge of "Osaka store" and "Kobe store" that are stores 212.

(b) Product Return/Replacement Box 212a of Store 212

Figure 5:
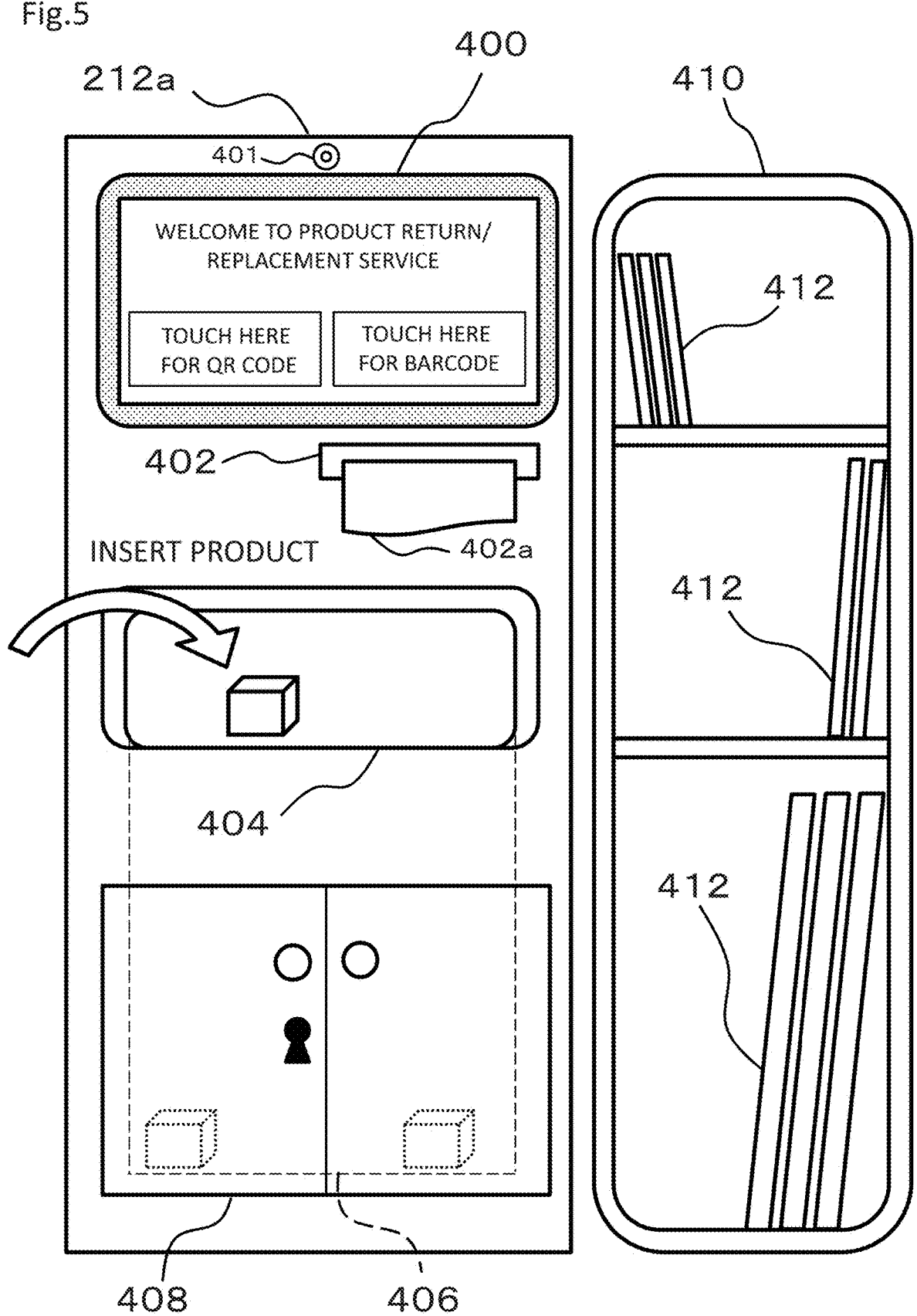
FIG. 5 is a diagram showing the appearance configuration of a product return/replacement box 212a in the present embodiment.

As described in FIG. 2, in the store 212, the product return/replacement box 212a is provided. The appearance configuration of the product return/replacement box 212a is shown in FIG. 5.

As shown in the figure, the product return/replacement box 212a includes an operation portion 400, a camera 401, a printer 402, a product insertion slot 404, a product storage portion 406 and a product removal slot 408.

The operation portion 400 is the screen of a touch panel which is operated by the consumer 210. The consumer 210 brings the product related to the return/replacement into the store 212, and operates the operation portion 400 of the product return/replacement box 212a so as to apply for the product return/replacement service.

In the vicinity of the operation portion 400, the camera 401 is arranged. The consumer 210 displays, on the screen of a smart phone or the like, a two-dimensional code indicating the product return/replacement reception code, and holds this two-dimensional code in front of the camera 401, and thus the camera 401 can be made to read the product return/replacement reception code.

The present embodiment is characterized in that the consumer 210 previously makes the product return/replacement reservation at the EC site so as to acquire the product return/replacement reception code. Furthermore, the present embodiment is characterized in that it is possible to indicate to the product return/replacement box 212a that the product related to the return/replacement is brought thereinto by only making the product return/replacement reception box 212a read the product return/replacement reception code. Furthermore, it is possible to notify this fact to the product return/replacement server 230a.

By the characteristic mechanism as described above, the consumer 210 can return/replace the product without writing predetermined items in a delivery slip or the like.

The camera 401 corresponds to a preferred example of a reading portion in the scope of claims. Specifically, the camera 401, a program for controlling the camera 401 so as to read the two-dimensional code and a CPU (which will be described later in FIG. 6) which executes the program correspond to a preferred configuration example of the reading portion in the scope of claims.

Instead of the smart phone which displays the two-dimensional code, paper on which the two-dimensional code is printed may be presented such that the two-dimensional code is read.

The printer 402 prints a label 402a which is necessary when the product return/replacement service is used. The consumer 210 sticks the printed label 402a to a box 412 in which the product is packed, and inserts it from the product insertion slot 404.

Here, the label 402a corresponds to a preferred example of a label in the scope of claims.

In the present embodiment, by the simple processing as described above, the consumer 210 can easily use the product return/replacement service. Consequently, it becomes easier to use electronic commerce.

The product storage portion 406 is a portion in which the product (product packed in the box 412) inserted from the product insertion slot 404 is stored. In the product storage portion 406, the product removal slot 408 serving as a door is provided. The product removal slot 408 is generally locked, and the driver of the truck carries a key therefor. After arriving at the store 210, the driver of the truck unlocks the product removal slot 408 of the product return/replacement box 212a so as to be able to remove the product stored in the product storage portion 406. The driver corresponds to a preferred example of a delivery person in the scope of claims.

Thereafter, the driver of the truck opens the product removal slot 408 as described above, removes the product from the product storage portion 406 and loads it on the truck. When the product is collected, the touch panel on the operation portion 400 and the camera 401 are used to read the label stuck to the box 412, and thus the status of the product return/replacement database 304 is updated. The details of this operation will be described later in the discussion of FIG. 10.

As described above, the truck delivers products to be sold to the store, and thereafter, instead, loads the products related to the return/replacement so as to deliver them to the logistics center 220.

The present embodiment is characterized in that the truck of the store logistics network 218 delivers the products to be sold to the store 212, and thereafter, the products related to the return/replacement instead of the products to be sold are loaded on the truck so as to be delivered to the logistics center 220. Consequently, as opposed to the truck returning without any load so far, in the present embodiment, the truck can carry the products related to the return/replacement, which results in a more efficient use of the truck transportation.

The arrangement of the configuration of the product return/replacement box 212a shown in FIG. 5 is not limited to the arrangement of FIG. 5. For example, the operation portion 400 may be arranged on the top surface instead of the front surface. The product insertion slot 404 may be arranged in the top surface. The product removal slot 408 may be provided in a side surface or the back surface instead of the front surface of the product return/replacement box 212*a*.

Although the camera 401 provided as a means for reading the QR code or the like is described as an example in FIG. 5, a contact-type infrared scanner or the like instead of the camera 401 may be provided on the product return/replacement box 212*a*.

Preferably, a shelf 410 in which the boxes 412 for packing the products related to the return/replacement are stored is arranged adjacent to the product return/replacement box 212*a*. The box 412 may be what they call a cardboard box, a box formed of thick paper or an envelope type storage bag. The consumer 210 brings only the product related to the return/replacement into the store 212, puts the product into the box 412, sticks the label 402*a* printed by the printer 402 and inserts the product from the product insertion slot 404 so as to be able to easily utilize the product return/replacement service.

<Functional Configuration of Product Return/Replacement Box 212*a*>

Figure 6:
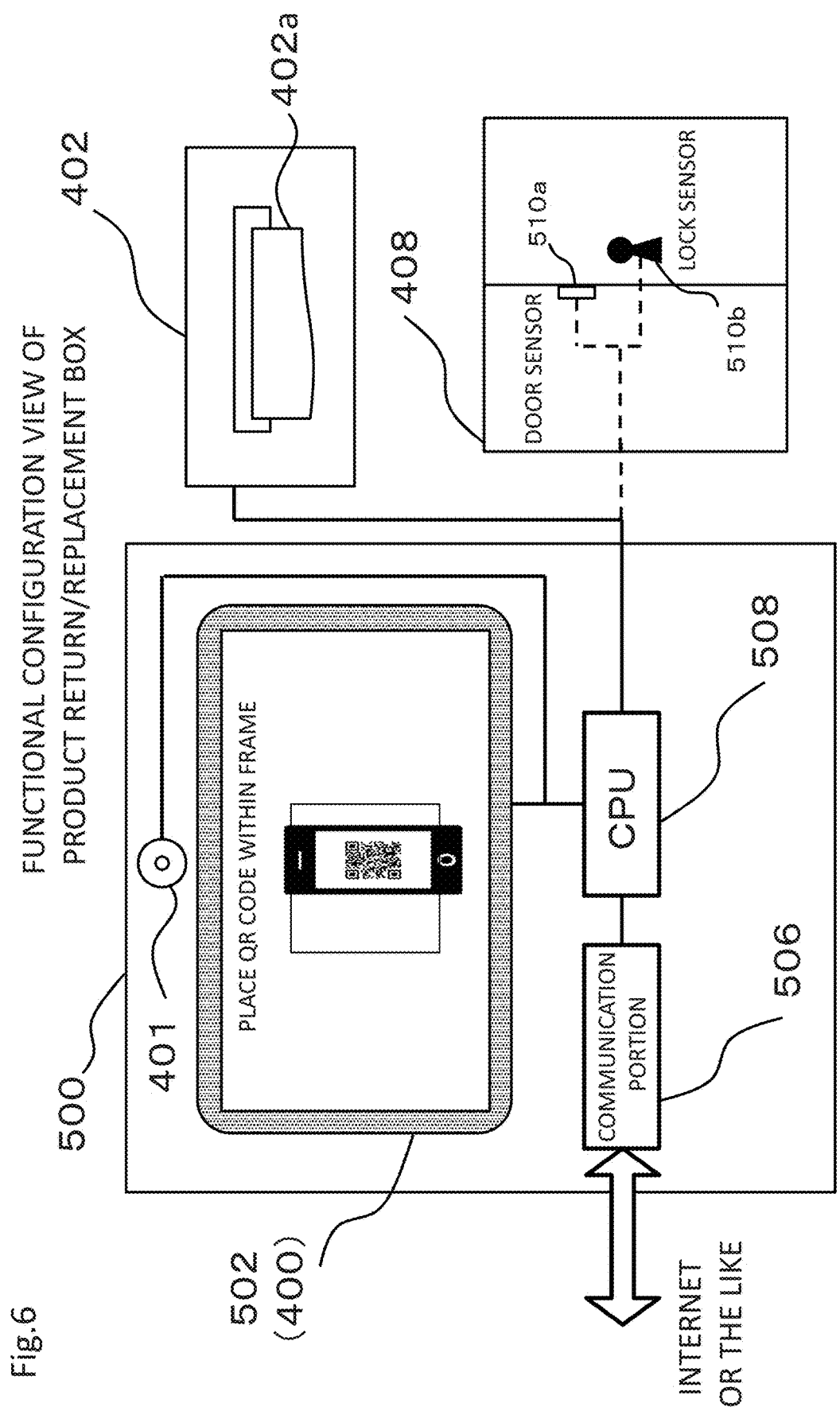
FIG. 6 is a diagram showing the functional configuration of the product return/replacement box 212a in the present embodiment.

The functional configuration of the product return/replacement box 212*a* is shown in FIG. 6.

The product return/replacement box 212*a* first includes a tablet computer 500, and the tablet computer 500 controls the functions of the product return/replacement box 212*a*. The display 502 of the tablet computer 500 forms a screen operation portion 400. The display 502 is a so-called touch type display, and the consumer 210 touches a predetermined menu according to indications on a screen so as to be able to execute a desired processing.

The tablet computer 500 includes the camera 401 adjacent to the display 502. The camera 401 is the same camera as the camera 401 in FIG. 5.

The tablet computer 500 includes a communication portion 506 so as to be able to communicate with the outside. With the communication portion 506, it is possible to communicate with the product return/replacement server 230*a* shown in FIG. 2 and the like. The communication portion 506 may be, for example, a communication interface which can perform communication through the Internet. Here, the Internet corresponds to a preferred example of the predetermined communication channel in the scope of claims. As the communication channel, various communication channels such as LTE and a local IP network may be used.

The tablet computer 500 includes a CPU 508 which controls the operation of the tablet computer 500 and which executes the operation of the product return/replacement box 212*a*. The CPU 508 executes programs describing these operations so as to realize the operations. The programs may be stored in a storage device within the tablet computer 500 or may be stored in a storage device which is located in another place.

The printer 402 of the product return/replacement box 212*a* is also connected to the tablet computer 500, and thus the printer 402 can be accessed from the CPU 508. The CPU 508 can make the printer 402 print, for example, the label 402*a*.

The CPU 508 corresponds to a preferred example of the processor in the scope of claims. However, instead of the CPU, a CPU module, various types of microcomputers and various types of computation units/computation processors may be used, and they also correspond to preferred examples of the processor in the scope of claims.

In the product removal slot 408 of the product return/replacement box 212*a*, a door sensor 510*a* is provided which detects whether the product removal slot 408 is opened, and the door sensor 510*a* is also connected to the tablet computer 500. Then, the CPU 508 accesses the door sensor 510*a* so as to be able to find whether the product removal slot 408 is opened or closed.

Furthermore, in the product removal slot 408, a lock sensor 510*b* is provided which detects whether the door of the product removal slot 408 is locked, and the lock sensor 510*b* is also connected to the tablet computer 500. Then, the CPU 508 accesses the lock sensor 510*b* so as to be able to find whether or not the door of the product removal slot 408 is locked.

The door sensor 510*a* and the lock sensor 510*b* are optional configurations, and are not necessarily essential configurations. This is because the tablet computer 500 do not always need to monitor the state of the product removal slot 408 through the door sensor 510*a* and the lock sensor 510*b*, as only the driver can open the door of the product removal slot 408, leaving a low possibility that others intervene in this operation. In this case, for example, in the product return/replacement box 212*a*, the parts of the tablet computer 500 and the printer 402 and the parts of the product storage portion 406, the product insertion slot 404 and the product removal slot 408 are not necessarily integral with each other (are not necessarily connected to each other).

For example, the product return/replacement box 212*a* may comprise only the tablet computer 500 and the printer 402. As the parts of the product storage portion 406, the product insertion slot 404 and the product removal slot 408, a storage container which can be locked may be prepared separately as a separate member.

The present embodiment is characterized in that the consumer 210 packs the product related to the return/replacement by himself or herself, and posts the product into the product insertion slot 404 of the product return/replacement box 212*a* so as to be able to simply use the product return/replacement processing service. A specific operation will be described in detail later.

(c) EC Operator Server 216*a* and EC Operator Terminal 216*b* of EC Operator 216

Figure 7:
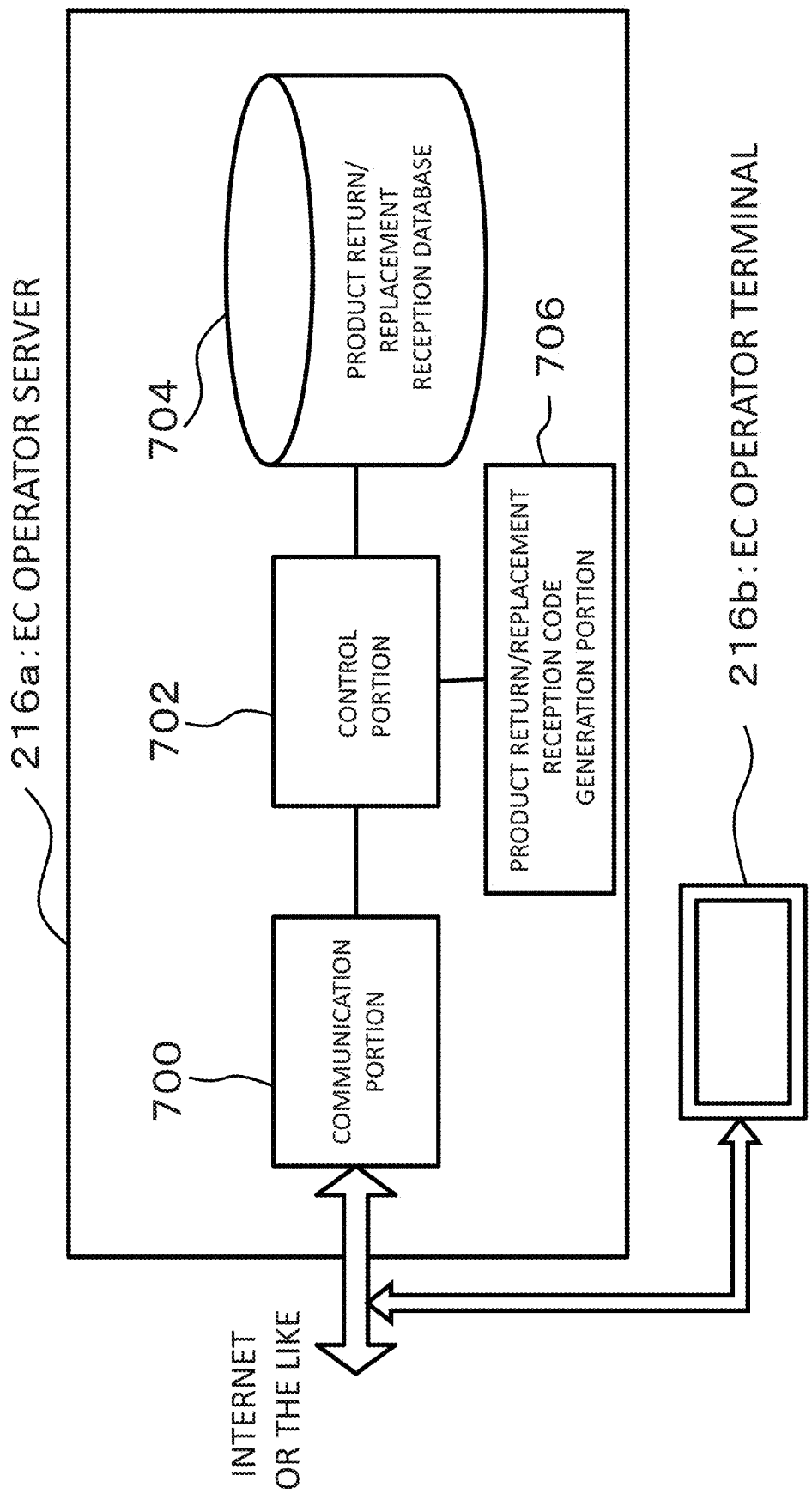
FIG. 7 is an illustrative view showing the configuration of an EC operator server 216a in the present embodiment.

As described in FIG. 2, the EC operator 216 includes the EC operator server 216*a*. The configuration of the EC operator server 216*a* is shown in FIG. 7.

As shown in the figure, the EC operator server 216*a* includes a product return/replacement reception database 704, a control portion 702 which controls the registration/reading of data on the product return/replacement with respect to the product return/replacement reception database 704, a communication portion 700 which communicates with the outside and a product return/replacement reception code generation portion 706.

The communication portion 700 is a communication interface which communicates with the outside, and may be, for example, a communication interface which is connected to the Internet. Hence, a predetermined external terminal and the like can access the EC operator server 216*a* through the communication portion 700.

For example, the control portion 702 registers, by a request from the outside, various types of data on the product return/replacement in the product return/replacement reception database 704, and reads, according to a request from the outside, data on the product return/replacement from the product return/replacement reception database 704 so as to transmit the data to the outside.

In particular, when the control portion 702 receives, through the communication portion 700, the product return/replacement reservation transmitted from the external consumer 210, the control portion 702 transmits it to the product return/replacement reception code generation portion 706. The product return/replacement reception code generation portion 706 generates the product return/replacement reception code based on the transmitted product return/replacement reservation, and transmits it to the control portion 702. The product return/replacement reception code is as described above in FIG. 4.

The control portion 702 receives the product return/replacement reception code so as to be able to rerun it to the consumer 210 through the communication portion 700. The control portion 702 registers, for each of the product return/replacement reception codes, data for managing the state of the product return processing in the product return/replacement reception database 704.

A specific operation will be described in detail later. The control portion 702 and the product return/replacement reception code generation portion 706 may be composed of, for example, programs which describe the operations of the control portion 702 and the product return/replacement reception code generation portion 706 and a CPU which executes the programs. The operation which will be described later is described with the programs. As the CPU, various types of microcomputers, various types of CPU modules, various types of computation units and computation processors may be used.

The product return/replacement reception database 704 is a database in which data on the product return/replacement is registered, and data is registered for each of products related to the return/replacement and for each of product return/replacement reception codes which are generated. Here, items stored in the product return/replacement reception database 704 may include, as in the product return/replacement database 304 of FIG. 4, the product return/replacement reception code, the status, the reception store, the logistics center, the delivery code, the reception date and time and the like. This state is shown in FIG. 4. However, since the product return/replacement database 304 can be referenced for the item of the "status", a configuration may be adopted in which the item of the "status" is not included in the product return/replacement reception database 704.

As already described, the product return/replacement reception code is composed of, for example, the SR, the EC operator code of 6 digits and the EC operator arbitrary setting code (arbitrary number of digits).

Preferably, in the EC operator server 216, not only the EC operator server 216a but also an EC operator terminal 216b is provided (see FIG. 7). The EC operator terminal 216b is a terminal which can perform communication through the Internet or the like, and may comprise a personal computer, a smart phone, or the like. The EC operator terminal 216b as described above is provided, and thus the completion of the product return/replacement delivery and the like are received not only by the EC operator server 216a but also by the EC operator terminal 216b comprising a personal computer or the like, which brings the advantage that the EC operator 216 can rapidly find the completion of the delivery.

However, the EC operator terminal 216b is not essential but optional. This is because some of the EC operator 216 may consider it sufficient to confirm the actual reception of the product by the EC operator 216 themselves. When the EC operator terminal 216b is not present, the processing operation of FIG. 11 which will be described later does not need to be performed.

(d) Logistics Center Terminal 220a of Logistics Center 220

In the logistics center 220, a logistics center terminal 220a is provided (see FIG. 2). The logistics center terminal 220a is a terminal which can perform communication through the Internet or the like, and can comprise a personal computer, a smart phone, or the like. The logistics center terminal 220a as described above is provided, and thus, the arrival of the product from the store 212, the dispatch of the product to the EC operator and the like can be notified to the product return/replacement server 230a. Consequently, the product return/replacement service center 230 can grasp the status of progress of the product return/replacement service in more detail.

4. Flow of Product Return/Replacement Service in Detail

An example of the flow of provision of the actual product return/replacement service will then be described with time charts and the like.

A description will be given using, as an example, a case where although the consumer 210 purchases predetermined several products at the EC site operated by the EC operator 216, since it is found that the size of a certain product does not fit, the product is returned/replaced.

(1) Product Return/Replacement Reservation Made by Consumer 210

The consumer 210 first makes a product return/replacement reservation. A time chart indicating the flow of processing of the product return/replacement reservation is shown in FIG. 8.

Figure 8:
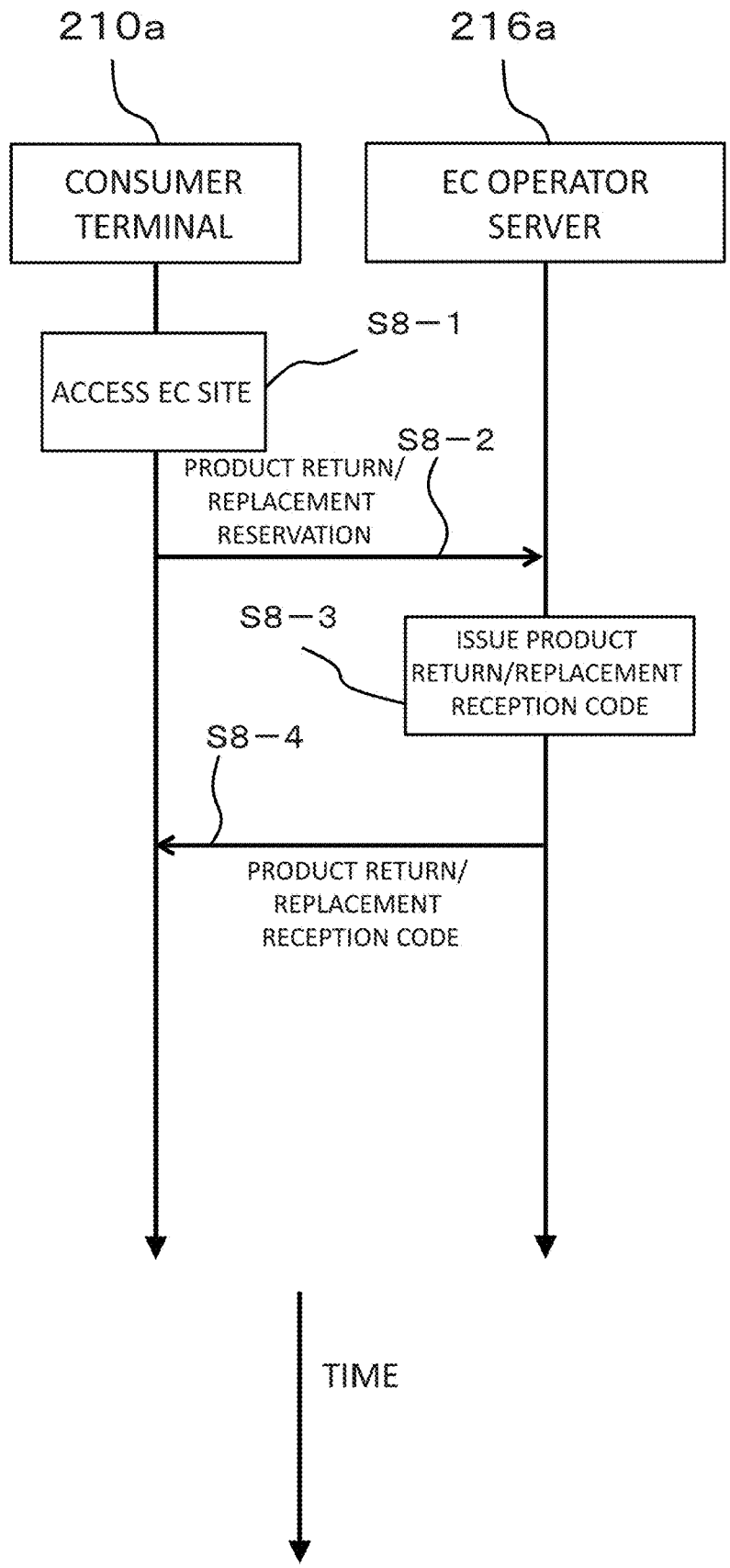
FIG. 8 is a time chart showing the flow of the processing of a product return/replacement service in the present embodiment.

As shown in FIG. 8, in step S8-1, the consumer 210 accesses the EC site related to product purchase from a consumer terminal 210a. The consumer 210 makes the product return/replacement reservation. This reservation is substantially the same procedure as in FIG. 13 in which the conventional technology is described.

In step S8-2, data on the product return/replacement reservation is transmitted from the consumer terminal 210a to the EC operator server 216a operated by the EC site. The data on the product return/replacement reservation may be data which includes a message indicating that the product return/replacement reservation is desired to be made, information on the consumer who makes the product return/replacement reservation, the product number of the product to be returned and the like. In addition, the data on the product return/replacement reservation may include order information when the order of the product is received, an order number and the like.

The communication portion 700 of the EC operator server 216a receives the data on the product return/replacement reservation, and transmits it to the control portion 702. When the control portion 702 detects that the received data is the product return/replacement reservation, the control portion 702 transmits it to the product return/replacement reception code generation portion 706.

In step S8-3, the product return/replacement reception code generation portion 706 which receives the product return/replacement reservation generates a product return/replacement reception code based on the data on the product return/replacement reservation which is transmitted. As described in FIG. 4 and the description thereof, the product return/replacement reception code is composed of the SR, the "EC operator code of 6 digits" and the "EC operator arbitrary setting code (arbitrary number of digits)". The product return/replacement reception code generation portion 706 may generate the EC operator arbitrary setting code (arbitrary number of digits) using the product number, the order number, the ID of the consumer and the like, which are indicated by the transmitted data on the product return/replacement reservation, and may combine this code with the SR and the EC operator code of 6 digits so as to generate the product return/replacement reception code.

The product return/replacement reception code generation portion 706 transmits the generated product return/replacement reception code to the control portion 702. The control portion 702 adds (registers) the entry of the received product return/replacement reception code to the product return/replacement reception database 704.

In step S8-4, the control portion 702 transmits the received product return/replacement reception code to the consumer terminal 210a through the communication portion 700. The details which are transmitted may be the product return/replacement reception code, the image data of a two-dimensional code (for example, a QR code (registered trademark)) indicating the product return/replacement reception code or another code. Instead of the product return/replacement reception code itself, only the image of a code such as a two-dimensional code indicating the product return/replacement reception code may be transmitted. Instead of the two-dimensional code, one-dimensional code may be adopted.

In step S8-4 described above, the consumer terminal 210a receives the product return/replacement reception code or the image data of a two-dimensional code or the like indicating the product return/replacement reception code. The consumer terminal 210a may have the function of displaying the received image data indicating the product return/replacement reception code on the display of the consumer terminal 210a or the function of converting the received product return/replacement reception code into the image of a two-dimensional code and displaying the image on the display of the consumer terminal 210a.

Although the consumer terminal 210a is preferably a smart phone, the consumer terminal 210a may be a notebook personal computer or a tablet computer. In addition, various information devices may be used as the consumer terminal 210a.

(2) Posting of Product Related to Return/Replacement into Product Return/Replacement Box 212a at Store Then, the consumer 210 brings the product related to the return/replacement into the store so as to post the product into the product return/replacement box 212a. A time chart indicating the flow of the processing thereof is shown in FIG. 9.

Figure 9:
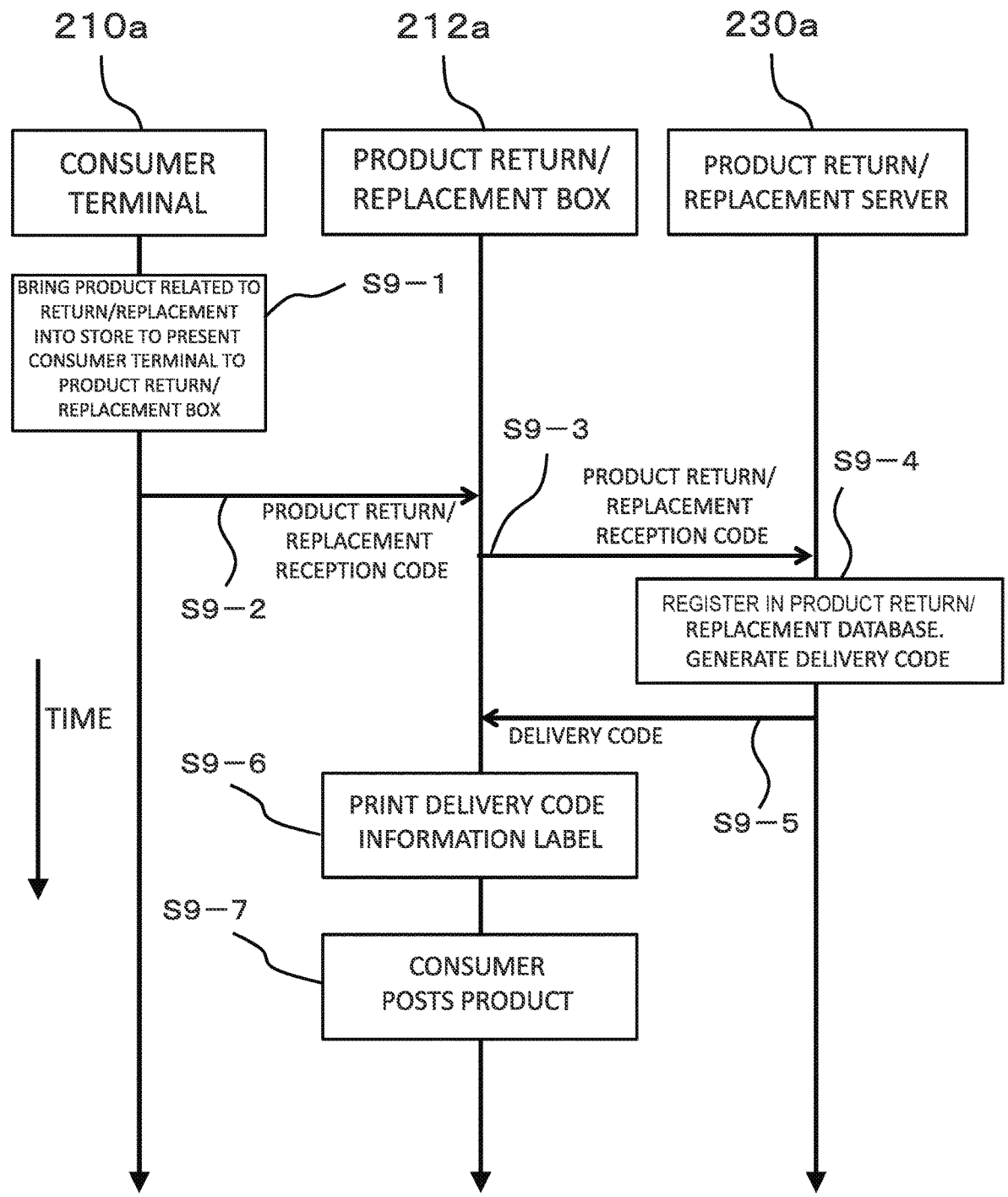
FIG. 9 is a time chart showing the flow of the processing of the product return/replacement service in the present embodiment.

As shown in FIG. 9, in step S9-1, the consumer 210 first brings the product related to the return/replacement into the store 212.

In step S9-2, the consumer 210 operates the operation screen 400 of the product return/replacement box 210a so as to display the screen of the product return/replacement service. The consumer 210 selects (touches) a two-dimensional code from a displayed button menu so as to move to the reading of the two-dimensional code. In the present embodiment, a QR code (registered trademark) is used as an example of the two-dimensional code The product return/replacement box 212a displays next the reading screen of the two-dimensional code, and the camera 401 starts to read the two-dimensional code. For example, the state of the screen is shown on the display 502 (operation screen 400) of FIG. 6.

The consumer 210 presents the consumer terminal 210a displaying the two-dimensional code in front of the camera 401, and thus the two-dimensional code is read (see the screen of the display 502 of FIG. 6). The consumer terminal 210a may be made to present a one-dimensional barcode. In such a case, the consumer 210 selects a barcode on the operation screen 400 of FIG. 5 (touches "click here for barcode" on the operation screen of FIG. 5), and thus the reading of the one-dimensional barcode is performed.

Then, in step S9-3, the product return/replacement box 212a transmits, to the product return/replacement server 230a, the product return/replacement reception code obtained by reading the two-dimensional code through the camera 401. Specifically, the image of the two-dimensional code read with the camera 401 of the product return/replacement box 212a is converted with the CPU 508 into the product return/replacement reception code, and the product return/replacement reception code is transmitted to the product return/replacement server 230a. Although the transmission may be performed through the Internet, another communication network may be used.

In step S9-4, the product return/replacement server 230a receives the product return/replacement reception code. Specifically, the communication portion 300 (see FIG. 3) receives the product return/replacement reception code from the outside through the Internet or the like. The communication portion 300 transmits the received product return/replacement reception code to the control portion 302, and the control portion 302 adds (registers), based on the product return/replacement reception code, a new entry to the product return/replacement database 304.

In this case, the control portion 302 can find the store 212 which receives the product return from the product return/replacement box 212a that transmits the product return/replacement reception code. When a new entry is registered (when the product return/replacement reception code is received), the control portion 302 sets the status to the "reception". The control portion 302 can recognize the date and time when the product return/replacement reception code is received as the "reception date and time". In this way, the control portion 302 can register a new entry in the product return/replacement database 304 (see FIG. 4). Here, the logistics center in charge of the store 212 may also be registered in the new entry.

Then, the control portion 302 of the product return/replacement server 230a transmits the received product return/replacement reception code to the delivery code generation portion 306. The delivery code generation portion 306 generates a delivery code according to the product return/replacement reception code. The delivery code corresponds to the product return/replacement reception code in a one-to-one relationship. For example, the delivery code may be generated as a serial number each time the delivery code generation portion 306 receives the product return/replacement reception code, and as long as a unique value is provided, there is no limitation as to how the delivery code is generated. The delivery code generation portion 306 transmits the generated delivery code to the control portion 302.

The present embodiment is characterized in that, as the delivery code, numerals, or numbers irrelevant to the product related to the return/replacement and the consumer 210 are used. In this way, even when the delivery code is frequently transmitted on the Internet, the possibility that information of the product and the consumer 210 thereof, the EC operator 216 and the like leaks out can be lowered. Even when a third party can find the delivery code, it is difficult to acquire useful information such as personal information only with the delivery code.

In step S9-5, the control portion 302 transmits the generated delivery code to the product return/replacement box 212a through the communication portion 300 (and the Internet).

Then, in step S9-6, the communication portion 506 of the product return/replacement box 212a receives the transmitted delivery code, and transmits it to the CPU 508. The CPU 508 makes the printer 402 print the label 402a of the transmitted delivery code. In this way, the consumer 210 acquires the label 402a on which the delivery code is printed. The label is an adhesive label for sticking, and two labels 402a which have the same details are printed. The consumer 210 sticks one of them to the packed product (product related to the return/replacement) and stores the other by himself or herself in order to confirm the product return/replacement processing.

The label 402a according to the present embodiment 1 corresponds to a preferred example of the label in the scope of claims.

In the present embodiment 1, for example, details as described below are printed with the printer 402 on the label 402a.

Delivery code: for example, "55550001"
Reception store: for example, "Tokyo store"
Date and time: for example, "2018/03/01"
Target EC operator: for example, indicated by an operator name
Return destination: name and address Furthermore, the details described above may be printed not only by normal characters, symbols, and numerals but also by a two-dimensional code. Not all of the details described above need to be printed. Not all of the details described above need to be included in the two-dimensional code.

For example, only the delivery code may be printed or the two-dimensional code may indicate only the delivery code. This is because the delivery code can be used to access the product return/replacement database 304 so as to make an inquiry about the details of the product. However, since it may be convenient that the store, the date and time and the like can be visually grasped by a "person" such as a driver, they may be printed.

The present embodiment 1 is characterized in that the product related to the return/replacement is managed with the delivery code described in the label 402a. In this way, personal information is not described in the product, and thus it is possible to reduce the possibility that personal information leaks out.

In particular, in the present embodiment, in a normal specified operation, personal information is not read with the delivery code. Hence, as long as the operation of the product return/replacement is properly performed, personal information does not appear externally, with the result that personal information is prevented from leaking out.

By contrast, in patent literature 1 described previously, when the product is delivered, the delivery person terminal reads the information code so as to acquire and display the delivery destination information of the product (claim 1 in patent literature 1). Hence, in a normal operation, personal information is displayed. Therefore, even when the operation of the product delivery is properly performed, personal information may leak out.

Then, in step S9-7, the consumer 210 posts the product (packed) to which the label is stuck into the product insertion slot 404. The product storage portion 406 of the product return/replacement box 212a has a structure similar to a mailbox, and thus it is difficult for a person who does not carry the key for the product removal slot 408 to remove, from the outside, the product which has been once posted. In order to remove the product, it is necessary to use the key for the product removal slot 408 so as to unlock and open the product removal slot 408 and to thereby remove the product in the product storage portion 406. The operation thereof will be subsequently described in FIG. 10.

(3) Collection and Delivery of Product from Product Return/Replacement Box 212a

The truck on a delivery round stops by the store 212 according to the store logistics network 218. The truck generally carries products to be sold at the store 212. The present embodiment is characterized in that at the same time, the driver of the truck removes and collects the product related to the return/replacement from the product return/replacement box 212a and delivers the product to the logistics center 220. The flow of the product collection and the delivery as described above will be described below based on the time chart of FIG. 10.

The driver of the truck based on the store logistics network 218 delivers, to the store 212, the products to be sold at the store 212, and thereafter performs an operation on the operation screen 400 of the product return/replacement box 212a so as to provide an instruction to perform product collection. After providing the instruction, the product return/replacement box 212a performs an operation on the product collection.

In step S10-1, the driver unlocks and opens the product removal slot 408 so as to remove the product related to the return/replacement. The driver possesses the key for the product removal slot 408 of the product return/replacement box 212a, and can use the key so as to open the product removal slot 408.

Here, various keys (and locks which are unlocked therewith) can be used.

A general cylinder lock and a key therefor may be adopted, and various keys may be adopted. A numeric keypad-type lock may be used. In this case, the driver is supposed to remember, as a key, numerals (numbers) for unlocking. The numbers which need to be remembered are an example of the "key" that is described above and that is possessed. Other than numbers, a string of symbols, numerals, and characters (for example, a group of symbols and numerals called a password) may be used as the "key". In addition, when a dial-type key is adopted, the driver also remembers numbers which are the key, and the numbers serve as the "key". A lock is known in which a magnetic card or an IC card is used as a key, and such a mechanism may be used.

In the present patent, not only the possession of a physical key but also the remembering of numbers for unlocking or symbols, numerals, and characters (group) such as a password is a preferred example of "possession of a key".

In step S10-2, the driver reads the label stuck to the removed product related to the return/replacement with the camera 401 of the product return/replacement box 212a. As described above, on the label, the delivery code and other information are printed not only by characters but also by the two-dimensional code, and by the reading with the camera 401, the delivery code of the product which is collected can be read.

In order for the driver to read the two-dimensional code, for example, it is preferable to select a menu therefor on the operation screen 400 and to make the tablet computer 500 start an operation of reading the two-dimensional code when the product is collected.

This may be called, for example, a product collection reading mode.

The product return/replacement box 212a (tablet computer 500) which moves to the product collection reading mode can inquire of the product return/replacement server 230a the number of products stored therein. The product return/replacement server 230a (the control portion 302 thereof) which receives the inquiry can search the product return/replacement database 304 so as to determine the number of products stored in the store 212. In order to do so, it is preferable to count, among entries for the store 212 in the product return/replacement database 304, entries whose status is the "reception".

Preferably, the product return/replacement box 212a which receives the number of products displays the number on the operation screen 400 during the operation of the product collection reading. In this case, two types of numbers which are the number of products stored and the number of products read are preferably displayed. For example, when the number of products stored is first 10, and then 3 products are read with the camera 401, for example, "3/10" or the like may be displayed on the operation screen 400. It is convenient that the driver can figure out how many products are read and how many products are left by referencing the display described above.

As a conventionally widely used procedure for collecting products, a procedure is widely adopted in which a driver holds a portable terminal so as to read a predetermined slip with the portable terminal and to collect products. By contrast, in the present embodiment 1, the label can be read by a function of the product return/replacement box 212a arranged in the store 212, and thus the driver does not need to carry a terminal for the product collection.

Furthermore, when a numeric keypad-type lock or a dial-type lock is used, the driver only remembers numbers serving as a key, and thus the number of tools/pieces of equipment which are carried by the driver can be decreased, with the result that the work is easily performed.

In step S10-3, the product return/replacement box 212a transmits, to the product return/replacement server 230a, the delivery code and other information which are read. Specifically, the information (including the delivery code) which is read with the camera 401 is transmitted by the CPU 508 through the communication portion 506 to the product return/replacement server 230a.

In step S10-4, the product return/replacement server 230a receives the delivery code and the like. In this way, the product return/replacement service center 230 (product return/replacement server 230a) can find that the driver picks up (collects or collects at the store) the product related to the return/replacement.

In step S10-4 described above, the communication portion 300 of the product return/replacement server 230a receives the delivery code and the like, and transmits them to the control portion 302. The control portion 302 can update, based on the transmitted delivery code, the status of the corresponding entry in the product return/replacement database 304. For example, the control portion 302 updates, to the "store collection", the status of the "reception" in the illustrative view of the product return/replacement database 304 shown in FIG. 4.

In step S10-5, the driver loads, on the truck, the products removed from the product storage portion 406 of the product return/replacement box 212a. All the products are collected, and thereafter the driver locks the key for the product removal slot 408.

In step S10-6, the driver drives the truck according to the store logistics network 218 so as to deliver the products to the logistics center 220.

In step S10-7, when the product arrives at the logistics center 220, the logistics center terminal 220a reads the label 402a stuck to the product which has arrived so as to obtain the information of the delivery code and the like.

In step S10-8, the logistics center terminal 220a transmits, to the product return/replacement server 230a, the delivery code which is read.

In step S10-9, the product return/replacement server 230a receives the transmitted delivery code. Although the operation in step S10-9 is basically the same as in step S10-4, the operation differs in that the status is updated from the "store collection" to the "logistics center return".

In step S10-10, in the logistics center 220, the products are sorted according to EC operators 216 to be stored. Then, the product is sequentially dispatched to each of the EC operators 216.

In step S10-11, when the product is dispatched to each of the EC operators 216, the label of the product to be dispatched is read again with the logistics center terminal 220a, and the delivery code which is read is transmitted to the product return/replacement server 230a.

In step S10-12, the product return/replacement server 230a receives the transmitted delivery code. Although the operation in step S10-12 is basically the same as in step S10-4, the operation differs in that the status is updated from the "logistics center return" to the "dispatch to EC operator".

As described above, in the present embodiment 1, each time processing is performed at each of the sites in the product return/replacement system 100, the delivery code is transmitted to the product return center 230 (product return/replacement server 230a). Consequently, the details registered in the product return/replacement database 304 about the product return/replacement server 230a can be updated. Hence, the product return/replacement service 230 is accessed from the outside, the details of the product return/replacement database 304 are checked and thus the state of progress of the return processing can be found, which can realize the product return/replacement system 100 in which the product return processing is easily managed and in which convenience is enhanced.

Utilization of Return Trip of Logistics Network

In the present embodiment, the driver who delivers the products to be sold (who corresponds to a preferred example of the delivery person in the scope of claims) collects the product related to the return/replacement, and thus in other words, the return trip of the logistics network can be used. Hence, the logistics network can be efficiently used.

Conventionally, it is somewhat difficult to utilize the return trip of the logistics network for a completely different service. Firstly, confusion between the different services easily occurs. In order to provide the different services, it is necessary to perform a plurality of types of slip processing and to use different portable terminals, and thus one driver needs to separately handle them, which brings not a small risk that the driver confuses them.

Secondly, the burden of the driver is increased. After all, it is necessary to separately use two or more types of slips and terminals, and thus it is expected to simply increase the burden and to increase errors. There is an idea of devising a software for a terminal so that a common terminal can be used in the same manner, which makes the confusion described above in the first reason more likely to occur since the common terminal is used in the same manner.

For the reasons described above, conventionally, a service in a return trip is generally limited to an ancillary service. For example, the collection of pallets and containers used in the transportation of products, the collection of sold defective products and the like are main operations in the return trip. Although "ancillary service in a return trip", such as the delivery of milk bottles, that is, delivering bottles with milk at the time of delivery and then collecting empty bottles instead is actually performed, a completely different type of service is hardly performed in a return trip.

By contrast, in the present embodiment, when the driver utilizes the product return/replacement service of the present embodiment, the driver does not need to carry either a new piece of equipment or a new terminal. The driver also does not need to perform the processing of a slip and the like, but just to read the product there with the camera 401, with the result that the driver is very unlikely to confuse the product return/replacement service with the exiting service. As long as at least the normal operation is performed, the product return/replacement service of the present embodiment can be completely separated from the existing service, and thus both services can be performed at the same time while security is maintained. This is because in short, the product return/replacement box 212a is provided in the store 212. Since the product return/replacement box 212a is located in the store 212, the driver only removes the product from the product storage portion 406 and reads it with the camera 401 so as to complete the product collection.

Although the present embodiment is characterized in that the consumer 210 does not need to fill in a slip for the product return/replacement at all, this is also advantageous for the person (driver) who performs the product collection (the driver also does not need to process the slip). Consequently, the driver can perform the product collection without a need to handle a new piece of equipment and a new slip at all, with the result that the return trip of the logistics network 218 can be used in the present embodiment for the first time.

Position of Product Return/Replacement Box 212a and Return Trip

As described above, the product return/replacement box 212 is located in the store 212 which is one of delivery destinations in the route of the store logistics network 218 (hereinafter simply referred to as the logistics network 218), and the so-called return trip of the logistics network 218 can be used. In the present embodiment, a downstream route from a certain store 212 in the logistics route is regarded as the return trip. For example, although in the logistics route, a plurality of delivery destinations (stores) may be visited, for each of the stores 212, a downstream logistics route from the store 212 corresponds to the "return trip" for the store 212.

In the present embodiment, the product return/replacement box 212 is arranged on the logistics route in the store 212 which is the delivery destination, and thus the return trip of the logistics route (the return trip for the store 212) can be used.

For example, the product return/replacement box 212a can be arranged at a logistics site other than the stores 212 on the logistics route. In that case, a downstream logistics route from the logistics site is the "return trip".

(4) Completion of Delivery of Product to EC Operator 216

Figure 10:
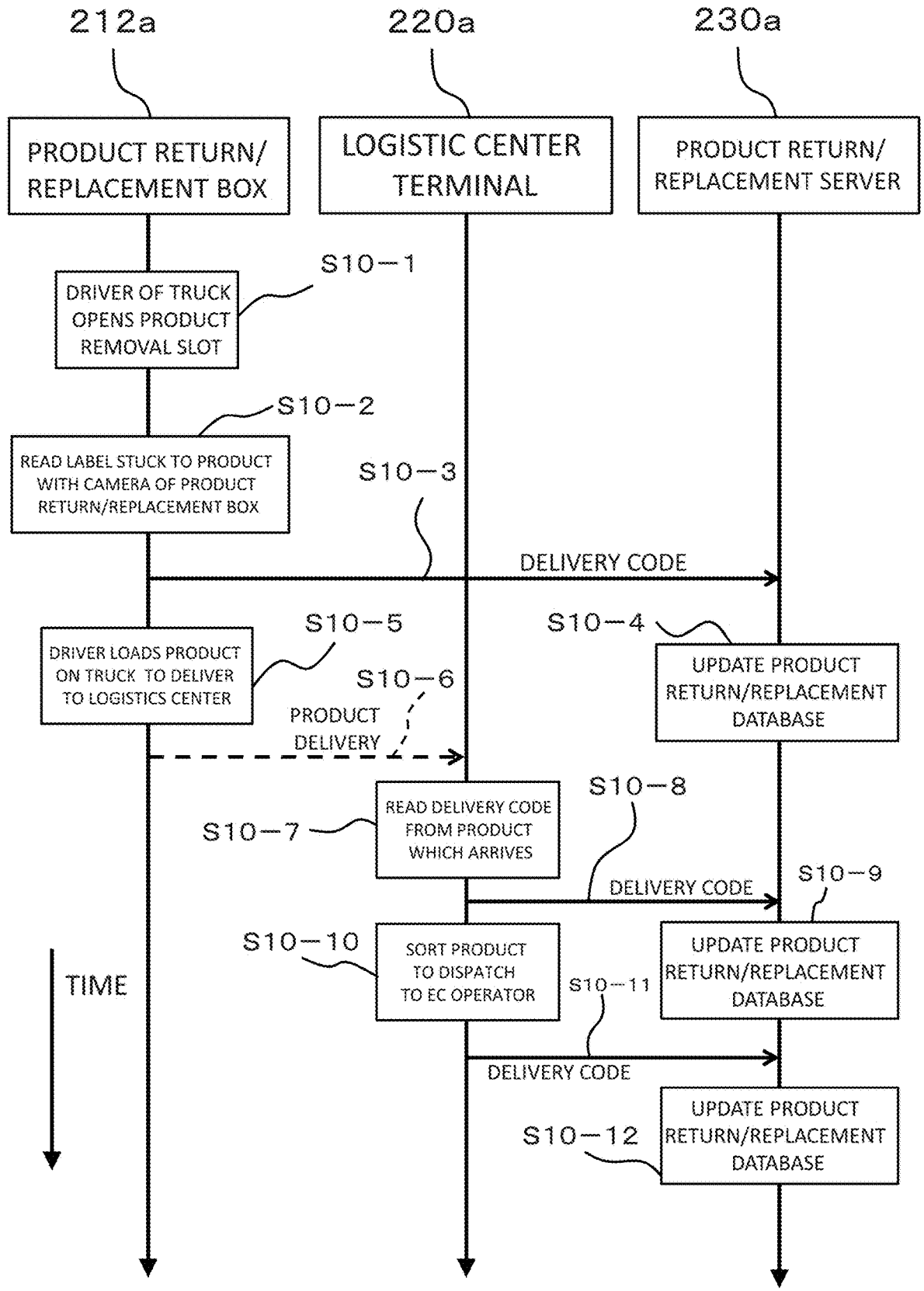
FIG. 10 is a time chart showing the flow of the processing of the product return/replacement service in the present embodiment.
Figure 11:
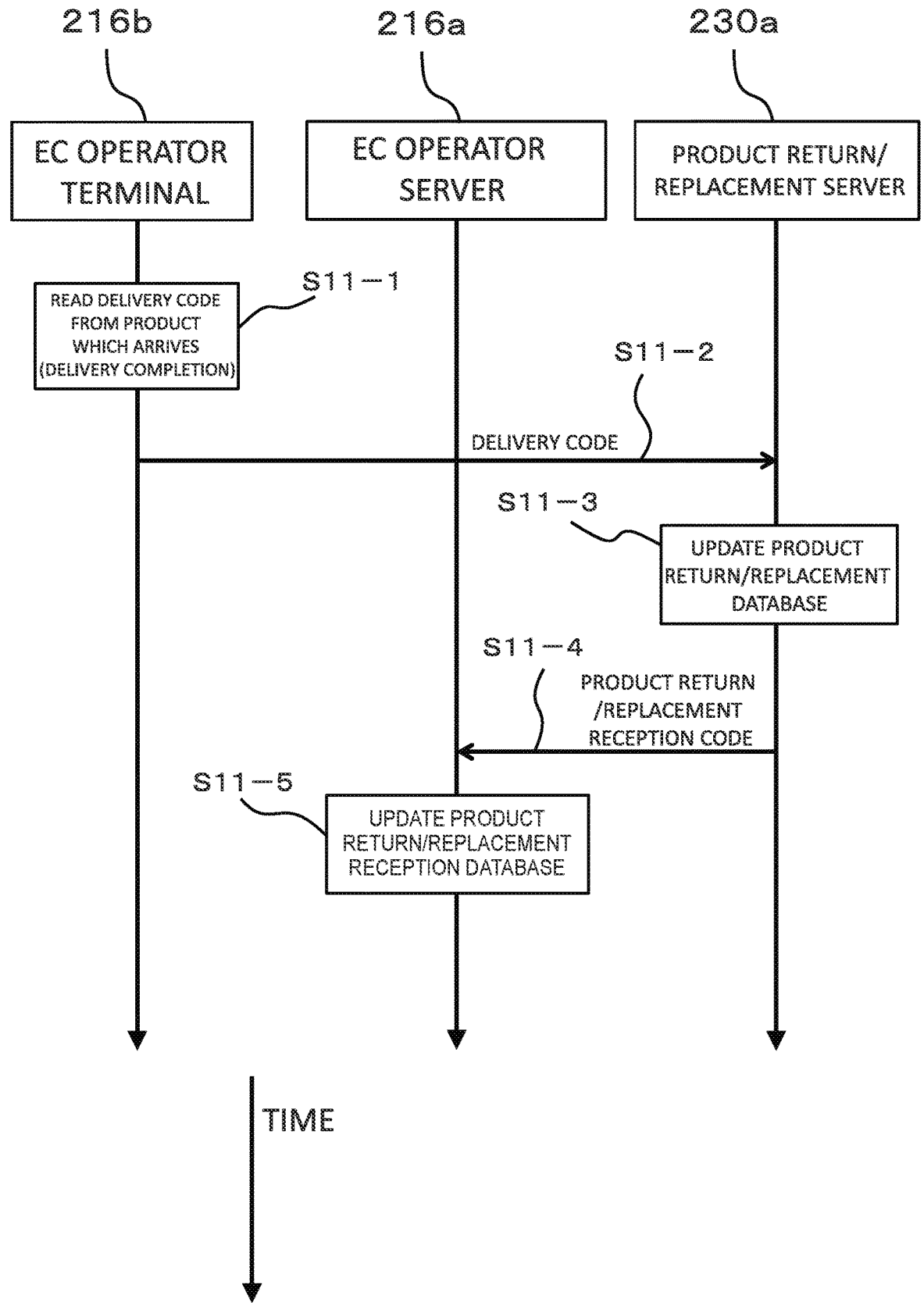
FIG. 11 is a time chart showing the flow of the processing of the product return/replacement service in the present embodiment.

In the description of the example in FIG. 10, the sorting of the products according to EC operators 216 is completed, and then the delivery to each of the EC operators 216 is performed. As processing after the delivery of the product to the EC operator 216, for example, the processing operation shown in the time chart of FIG. 11 may be performed. The operation shown in the time chart of FIG. 11 is an optional processing operation, and thus the EC operator 216 does not need to perform the operation of FIG. 11.

First, when in step S11-1, the product is delivered to the EC operator 216, the label of the product is read with the EC operator terminal 216b, and thus the delivery code and the like are obtained.

In step S11-2, the EC operator terminal 216b transmits, to the product return/replacement server 230a, the delivery code which is read.

In step S11-3, the product return/replacement server 230a receives the transmitted delivery code. Although the operation in step S11-32 is basically the same as in step S10-4 and the like, the operation differs in that the status is updated from the "dispatch to EC operator" to "delivery completion".

In step S11-4, the product return/replacement server 230a transmits the product return/replacement reception code to the EC operator server 216a. Specifically, after the updating to the "delivery completion" described above, the control portion 302 reads the product return/replacement reception code of the updated record from the product return/replacement database 304, and transmits it through the communication portion 300 to the EC operator server 216a.

In step S11-5, the EC operator server 216a receives the product return/replacement reception code. Specifically, the communication portion 700 of the EC operator server 216a receives the product return/replacement reception code, and transmits it to the control portion 702. When the control portion 702 receives the product return/replacement reception code, the control portion 702 can find that the delivery completion is registered in the product return/replacement database 304 of the product return/replacement server 230a, and the status thereof in the record of the product return/replacement reception database 704 is updated to the "delivery completion".

Whether or not the processing of FIG. 11 is performed may be changed for each of the EC operators 216. For example, an A operator performs the processing of FIG. 11 and that a B operator does not perform the processing of FIG. 11.

In this way, the processing of the return/replacement of the product is completed.

Product Return/Replacement Server 230a and Personal Information

The product return/replacement server 230a in which the present embodiment is characterized includes the product return/replacement database 304 so as to manage the processing of the product return/replacement. The product return/replacement database 304 is a database which comprises various items as shown in FIG. 4. As shown in FIG. 4, in the product return/replacement database 304, personal information is not basically stored.

Hence, even when any error occurs, in a case where communication is performed with the product return/replacement box 212a through the Internet or the like, personal information is prevented from leaking out to the side of the product return/replacement box 212a.

Likewise, in the present embodiment, even when communication is performed with the EC operator terminal 216b through the Internet (for example, step S11-1 described above), personal information is prevented from leaking out from the product return/replacement database 304 to the EC operator terminal 216b.

This is the same for the other types of terminals. In the present embodiment, it is possible that another type of terminal which is not shown in FIG. 2 communicates with the product return/replacement server 230a through the Internet or the like so as to access the product return/replacement database 304. However, in such a case, even when any unauthorized means is taken, personal information is prevented from leaking out to the type of terminal described above.

By contrast, for example, in the invention disclosed in patent literature 1 described previously, since personal information (delivery destination information) is displayed on a display portion (claim 1 in patent literature 1), when a malicious person accidentally references the personal information, the personal information may leak out.

As described above, in the present embodiment 1, the state of the product return/replacement is managed with the delivery code which does not include the personal information of the consumer 210, and thus it is possible to reduce the possibility that personal information leaks out.

At each of the sites of the product return/replacement processing, the label stuck to the product is read as necessary, and the delivery code which is read is notified to the product return/replacement server 230a through the Internet or the like, with the result that it is possible to sequentially monitor the status of the product return/replacement. For the collection of the product related to the return/replacement, the so-called return route of the delivery of the products to be sold of the truck of the store logistics network 218 is used, and thus the truck can be efficiently used.

B. Embodiment 2

5. Embodiment 2: Case where EC Operator 216 Previously Includes Product Return/Replacement Reservation Label in Product and Sends it In the embodiment 1 described in 3-1, 3-2 and 4 mentioned above, the consumer previously makes the product return/replacement reservation so as to acquire the product return/replacement reception code. Then, the product return/replacement reception code is presented to the product return/replacement box 212a, and thus the product return/replacement box 212a prints the label on which the delivery code is printed. Then, the consumer 210 sticks the label to the box of the product or a packing material, and posts it into the product return/replacement box 212a.

However, the EC operator 216 may previously include, in the product, the product return/replacement reservation label on which the product return/replacement reception code is printed so as to send it to the consumer 210. Although here, the "product return/replacement reception code is printed" means that a two-dimensional code or a one-dimensional code indicating the product return/replacement reception code is printed, the product return/replacement reception code itself may be printed.

In this case, the consumer 210 can present, to the product return/replacement box 212a, without being processed, the product return/replacement reservation label which is included by the EC operator 216 in the product and on which the product return/replacement reception code is printed. The camera 402 of the product return/replacement box 212a reads the product return/replacement reception code. Consequently, the product return/replacement box 212a naturally performs the same operation as in the case where the product return/replacement reception code is presented with the screen of a smart phone or the like.

Product Return/Replacement Reservation

In the present embodiment 2, there may be a case where the consumer 210 does not make the product return/replacement reservation as in FIG. 8 described previously or there may be a case where the consumer 210 makes the product return/replacement reservation.

This is because consideration is given to the fact that there can be a case where even when the product return/replacement reservation is made on the EC site, a two-dimensional code or a one-dimensional code is not issued (displayed) to the smart phone.

6. Variations

6-1 Examples of Store Other than Retail Chain, Location of Arrangement of Product Return/Replacement Box (1) Other Retail Stores In the present embodiments described above, the examples where the product return/replacement box 212a is arranged in the "store" of the retail chain are described. However, the product return/replacement box 212a may be arranged at any place, area or location, as long as the service of the logistics network can be performed, For example, although in the examples described above, the store is assumed to be the store of the retail chain, as long as the store can cover the logistics network, the store may be a franchise store. For example, a convenience store is a preferred example. In this case, a logistics network for the franchise store can be used instead of the store logistics network 218 for the retailer described above.

As long as it is covered by the logistics network, the store described above may be a store of a so-called supermarket or a general merchandise store (GMS) or each store in a department store.

Each of them corresponds to a preferred example of a "store that is a delivery destination" in the scope of claims.

(2) Transportation Operator, Logistics Site

The store 212 described above may be a store (post office) which performs a so-called postal business. This is because in the postal business, a logistics network which transports postal items is constructed. Likewise, at the logistics site of the logistics route in the store logistics network 218, the product return/replacement box 212a may be installed. For the same reason, the product return/replacement box 212a may be installed adjacent to a mailbox. This is because the mailbox also covers a mechanism for periodically transporting postal items.

The store 212 described above may be a store of a transportation operator or a store of a home-delivery operator.

They correspond to a preferred example of the "logistics site" in the scope of claims.

(3) Vending Machine

Although in the embodiments described above, the examples of the store 212 are described, as long as the service of the logistics network can be performed, the product return/replacement box 212a may be installed in a place, an area or a position where no person is constantly present. For example, as described above, the product return/replacement box 212a may be provided adjacent to a mailbox or arranged adjacent to a vending machine. This is because a truck or the like (logistics network) is periodically driven to the vending machine in order to replenish products.

The mailbox described above corresponds to a preferred example of the "logistics site" in the scope of claims, and since the vending machine described above is a so-called unmanned store, the vending machine corresponds to a preferred example of the "store that is a delivery destination" in the scope of claims.

(4) Transportation Site

Instead of the store 212 described above, the product return/replacement box 212a may be arranged in a station, an airport, a port, an SA (service area) of a freeway or the like. In these cases, logistics networks in which a train, a plane, a ship, and an automobile are used as transportation means may be used as the store logistics network 218 described above. The transportation sites described above correspond to preferred examples of the "logistics site" in the scope of claims.

(5) Others

Instead of the store described above, the product return/replacement box 212a may be arranged adjacent to a bus stop or the like. This is because in the case of the bus stop, a logistics network in which a bus itself is a transportation means may be considered as the logistics network. Hence, the bus stop and the like correspond to a preferred example of the "logistics site" in the scope of claims.

6-2. Mixing of Product Return and Product Replacement

In the embodiments described above, only the product return service may be provided or a system which provides only the product replacement service may be constructed.

Furthermore, a system which provides the product return service and the product replacement service such that they are mixed may be constructed. In this case, an A operator may utilize only the product return service, a B operator may utilize only the product replacement service and a C operator may utilize both the product return service and the product replacement service.

6-3. Driver

In the description of the embodiments mentioned above, the driver performs the processing of the product collection and the like, and the driver corresponds to a preferred example of the delivery person in the scope of claims. However, a person other than the driver may perform the processing of the product collection. For example, an assistant of the driver may perform the processing. In this case, the assistant of the driver corresponds to a preferred example of the delivery person in the scope of claims.

6-4. Others (1) The embodiments 1 and 2 described above are an example of the means for realizing the present invention and need to be modified or changed if necessary depending on the configurations of the devices and various types of conditions to which the present invention is applied, and the present invention is not limited to the aspects of the present embodiment 1 and 2.

REFERENCE SIGNS LIST 10, 210 consumer
12, 212 store
14 home-delivery operator
16, 216 EC operator
100 product return/replacement system
210a consumer terminal
212a product return/replacement box
216a EC operator server
218 store logistics network
220 logistics center
222 transportation operator
230 product return/replacement service center
230a product return/replacement server
300, 700 communication portion
302, 702 control portion
304 product return/replacement database
400 operation screen
401 camera
402 printer
402a label
404 product insertion slot
406 product storage portion
408 product removal slot
410 shelf
412 box (cardboard box)
500 tablet computer
502 display (operation screen)
506 communication portion
508 CPU
704 product return/replacement reception database
706 product return/replacement reception code generation portion
A, B product return/replacement flow

The invention claimed is:

1. A product return/replacement system comprising:
(a) an external product return/replacement server; and
(b) a kiosk for returning/replacing a product,
(c) wherein the external product return/replacement server comprises:
a product return/replacement database in which processed data of the product return/replacement is registered,
wherein the external product return/replacement server is programmed to:
communicate with an external electronic device so as to receive a product return/replacement reception code,
register, when receiving the product return/replacement reception code, a record related to the product return/replacement reception code in the product return/replacement database,
generate, when receiving the product return/replacement reception code, a delivery code corresponding to the product return/replacement reception code, and
transmit the delivery code to a party which transmits the product return/replacement reception code,
(d) wherein the kiosk comprises:
a product storage compartment integrated with the kiosk in which the product is to be stored;
a product insertion slot disposed on a side of the kiosk, and configured to direct the product into the product storage compartment;
a touchscreen display configured to receive user input and display information to the user regarding a process for returning/replacing the product and using the kiosk;
a computer; and
a printer,
wherein the computer is programmed to:
read a product return/replacement reception code that is presented by a consumer who wants to return/replace the product and that indicates that a product return/replacement reservation is made,
transmit the product return/replacement reception code that is read to the external product return/replacement server so as to receive the delivery code for managing a delivery status of the product from the external product return/replacement server, and control the printer to print a label on which the delivery code transmitted from the external product return/replacement server is displayed, wherein the printed label is configured to stick to the product related to the return/replacement, and when the computer reads the delivery code which is displayed on the label stuck to the product, the computer transmits the delivery code to the external product return/replacement server.

2. The product return/replacement system according to claim 1, wherein the product return/replacement reception code is a product return/replacement reception code that is acquired by the consumer from an electronic commerce server of an electronic commerce operator from which the product is purchased/lent.

3. The product return/replacement system according to claim 1, wherein the product return/replacement reception code is displayed on a product return/replacement reservation label that is included in the product sent by an electronic commerce operator from which the product is purchased/lent, and the computer reads the product return/replacement reception code on the product return/replacement reservation label.

4. The product return/replacement system according to claim 1, wherein the product return/replacement reception code is a two-dimensional code or a one-dimensional code.

5. The product return/replacement system according to claim 1, wherein each time the product return/replacement reception code is received, the external product return/replacement server sequentially generates the delivery code which is a serial number.

6. The product return/replacement system according to claim 1, wherein when the external product return/replacement server receives the delivery code, the external product return/replacement server updates, according to a transmission source of the delivery code, a status of data corresponding to the delivery code in the product return/replacement database.

7. The product return/replacement system according to claim 1, wherein when the external product return/replacement server receives the delivery code and a transmission source of the delivery code is a terminal of an electronic commerce operator which is a destination of the return/replacement, the external product return/replacement server updates the status of the data corresponding to the delivery code in the product return/replacement database to return/replacement completion, and transmits the product return/replacement reception code of the electronic commerce operator.

* * * * *